US009043458B2

(12) United States Patent
Balaji et al.

(10) Patent No.: US 9,043,458 B2
(45) Date of Patent: May 26, 2015

(54) FRAMEWORK FOR FACILITATING IMPLEMENTATION OF MULTI-TENANT SAAS ARCHITECTURE

(71) Applicant: Cognizant Technology Solutions India Pvt. Ltd., Chennai (IN)

(72) Inventors: Mahesh Balaji, Chennai (IN); Moinak Bhattacharya, Calcutta (IN); Kiran Chand Palakkattiri, Chalissery (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 211 days.

(21) Appl. No.: 13/903,343

(22) Filed: May 28, 2013

(65) Prior Publication Data
US 2014/0289391 A1    Sep. 25, 2014

(30) Foreign Application Priority Data
Mar. 19, 2013    (IN) .......................... 1177/CHE/2013

(51) Int. Cl.
*H04L 12/26*    (2006.01)
(52) U.S. Cl.
CPC ...................................... *H04L 43/04* (2013.01)
(58) Field of Classification Search
CPC ...................................................... H04L 43/04
USPC ........... 709/217, 219, 224, 228; 717/101, 104
See application file for complete search history.

(56) References Cited

U.S. PATENT DOCUMENTS

| | | |
|---|---|---|
| 8,019,812 B2 | 9/2011 | Janedittakarn et al. |
| 8,195,743 B2 | 6/2012 | Janedittakarn et al. |
| 2010/0023937 A1 | 1/2010 | Kothari et al. |
| 2010/0250712 A1* | 9/2010 | Ellison et al. ................. 709/219 |
| 2011/0145326 A1 | 6/2011 | Lee et al. |
| 2013/0091416 A1* | 4/2013 | Villoslada De La Torre et al. ............................. 715/234 |

OTHER PUBLICATIONS

"Architectural Concerns in Multi-Tenant SaaS Applications"—Krebs et al, Karlsruhe Institute of Technology, May 2011 https://sdqweb.ipd.kit.edu/publications/pdfs/KrMoKo2012-closer-multitenant-sass.pdf.*

* cited by examiner

*Primary Examiner* — Randy Scott
(74) *Attorney, Agent, or Firm* — Lerner, David, Littenberg, Krumholz & Mentlik, LLP

(57) ABSTRACT

A framework for implementing multitenant architecture is provided. The framework comprises a framework services module which is configured to provide framework services that facilitate abstraction of Software-as-a-Service (SaaS) services and crosscutting services for a Greenfield application and a non SaaS based web application. Further the abstraction results in a SaaS based multitenant web application. The framework further comprises a runtime module configured to automatically integrate and consume the framework services and APIs to facilitate monitoring and controlling of features associated with the SaaS based multitenant web application. The framework further comprises a metadata services module configured to provide a plurality of metadata services to facilitate abstraction of storage structure of metadata associated with the framework and act as APIs for managing the metadata. The framework further comprises a role based administration module that facilitates management of the metadata through a tenant administrator and a product administrator.

43 Claims, 10 Drawing Sheets

FRAMEWORK FOR FACILITATING IMPLEMENTATION OF MULTI-TENANT SaaS ARCHITECTURE

CROSS-REFERENCE TO RELATED APPLICATIONS

The present application claims priority from Indian Application No. 1177/CHE/2013 filed Mar. 19, 2013, the disclosure of which is hereby incorporated herein by reference.

FIELD OF THE INVENTION

The present invention relates generally to Software-as-a-Service (SaaS) applications. More particularly, the present invention provides a framework for facilitating implementation of multi-tenant SaaS architecture.

BACKGROUND OF THE INVENTION

With the advent of cloud computing, multi-tenant Software-as-a-Service (SaaS) architectures are being used more amongst SaaS providers. In a multi-tenant SaaS architecture an application is deployed and maintained centrally, while administered and accessed remotely over Internet. The end users grouped as tenants, access features of the application and share the resources associated with the application. The access to the features of the application may be billed to the tenants on a subscription license model or 'pay-per-use' models.

Multi-tenant architecture results in many benefits to the SaaS provider, with centralized control on management of service and upgrades. The multi-tenant architecture allows scaling from a single tenant to thousands of tenants by simply plugging more hardware into the system, changing few configurations, and without modifying the software resources. Further, the nature of the multi-tenant architecture makes it easier for the SaaS provider to deliver more efficient and effective service and support as only one platform needs to be monitored and managed. Furthermore, upgrading the software version gets easier as modifications and upgrading needs to be done at a single and centralized place.

To adopt or implement the multi-tenant architecture for an application, many frameworks are available in the market for the SaaS providers. However, these frameworks suffer from numerous major gaps between the expectations of the SaaS provider and availability of the solutions. Some of the critical gaps with which the current frameworks are available are repeated job of wiring up the framework with Line Of Business (LOB) application, lack of customization, large number of dependencies with underlying technologies of the framework, no extensibility support to meet the future requirements, lack of productivity tools, the solution provided for a problem in a given context becoming irrelevant in another context, and supporting either design time integration or run time integration and not both. The above limitations or gaps of the available frameworks result in increased implementation or adoption time for the multi-tenant architecture. This in turn increases the time and costs to bring the SaaS based multi-tenant web application to the market and thus, decreasing the Returns on Investments (ROI).

In light of the above, there is a need for a framework to facilitate implementation of multi-tenant SaaS architecture for a software application by overcoming the limitations of the available solutions. Further, there is a need for a framework that could reduce the implementation or adoption time for the multi-tenant architecture and thus, increasing the ROI for the SaaS providers.

SUMMARY OF THE INVENTION

In an embodiment of the present invention, a framework for implementing multitenant architecture is provided. The framework comprises a framework services module configured to provide a plurality of framework services. The plurality of framework services facilitate abstraction of Software-as-a-Service (SaaS) services and crosscutting services for at least one of: a green field application and a non SaaS based web application. Further, the abstraction results in a SaaS based multitenant web application. In an embodiment of the present invention, the plurality of framework services comprise at least one of: a context creation service, a metering service, a profile details service, a logging service, a notification service, a membership service, and a rule evaluation service. In an embodiment of the present invention, the SaaS based multitenant web application is at least one of: a user interface enabled web application, a web application that incorporates plurality web services distributed over web, and a rich internet application. Further, the SaaS based multi-tenant web application may be hosted in at least one of: a Virtual Private Datacenter (VPDC), a Virtual Private Cloud (VPC), and a public cloud.

The framework further comprises a runtime module configured to automatically integrate and consume the framework services and a plurality of Application Programming Interfaces (APIs) in a predefined manner to facilitate monitoring and controlling of features associated with the SaaS based multitenant web application. In an embodiment of the present invention, the runtime module facilitates monitoring and controlling of features by providing a plurality of runtime services, the plurality of runtime services comprising a metering service, a quota management service, a context awareness service, a type customization service, a presentation customization service, an asynchronized contexts service, a monitoring service, an error handling service, a tracking service, a notifications service, a rule evaluation service, an authorization service, and an authentication service. Further, in an embodiment of the present invention, the APIs comprise service side APIs and client side APIs and are provided by an API module. Further, the service side APIs are associated with the framework services module and allow the runtime module to connect to the metadata. The client side APIs are associated with the runtime module and allow access to client side services to a calling code.

In an embodiment of the present invention, the metering service facilitates metering of usage of each of the features associated with the SaaS based multitenant web application, transfer of data corresponding to the features, and usage time of the features at a granular level by facilitating recording and monitoring of every single use of designated feature. The metering service further facilitates metering a request and a corresponding response of a request-response cycle and records each feature usage within the cycle using predefined co-relations between the requests and responses. The monitoring service facilitates triggering actions when access to the features reaches to a predefined limit for at least one of: a tenant and a user associated with the tenant.

In an embodiment of the present invention, the context awareness service facilitates loading of context data on client side. The context data comprises user context data, tenant context data, resource context data, subscription context data, and custom type context data. Further, a context exchange module establishes a bidirectional virtual channel to pass the context data between a service client on the client side and a framework service on the service side. In an embodiment of the present invention, the passing of the context data is in at least one of: half duplex mode and full duplex mode. In an embodiment of the present invention, the runtime module further comprises a framework service component specification, the framework service component specification is configured to allow a service client to connect to the plurality of framework services being hosted at least one of: remotely and locally.

In an embodiment of the present invention, the entity customization service allows tenants of the SaaS based multi-tenant web application to customize entities by adding additional fields comprising predefined business requirements, governance, and reporting. In an embodiment of the present invention, the customization of entities is facilitated by a type extensibility component. The type extensibility component facilitates customization of entities by providing a support for its consumption using a template that is independent of underlying technology of the framework.

In an embodiment of the present invention, the presentation customization service facilitates the tenant administrator to customize and personalize rendering of at least one of: customized entities, resources, themes, web parts, and personalization data. The customized entities, resources, themes, web parts, and personalization data are associated with plurality of tenants. Further in an embodiment of the present invention, the asynchronized contexts service provides an update on the state of the asynchronous operations that take place on web. Furthermore, in an embodiment of the present invention, the rule evaluation service facilitates the tenant administrator to define rules using the administration module. The defined rules are mapped with objects in injection points defined in the SaaS based multi-tenant web application. Further, the rules are evaluated using at least one of: a manual approach and an automatic approach.

In an embodiment of the present invention, the authorization service facilitates role based feature authorization by allowing the tenant administrator to create roles and map the created roles with the features associated with the SaaS based multitenant web application. The role based feature authorization allows the tenant administrator to authorize the roles at a granular level.

In an embodiment of the present invention, the runtime module further provides a native object lifetime management service for controlling lifetime of objects. The native object lifetime management service provides an appropriate lifetime management extension that connects life span of an object with underlying technology of the framework to control the lifetime of the object. In an embodiment of the present invention, the runtime module abstracts a dependency injection container for resolving the abstracted framework service. The design of the abstraction of the dependency injection container facilitates integration of a plurality of dependency injection mechanism within the framework without recompiling the SaaS based multi-tenant web application. In an embodiment of the present invention, the runtime module abstracts an interception runtime for enabling Inversion of Control (IoC) and allowing interception layer to connect to a plurality of interception providers. In an embodiment of the present invention, the runtime module further facilitates tenant awareness and isolation of data associated with a plurality of tenants by extending state management in an underlying tier using a native object lifetime management service and isolating data associated with the plurality of tenants within the runtime module.

The framework further comprises a metadata services module configured to provide a plurality of metadata services. The metadata services facilitate abstraction of storage structure of metadata associated with the framework, and act as APIs for managing the metadata. In an embodiment of the present invention, the plurality of metadata services comprise at least one of an application management service, a subscription management service, a package management service, a type customization service, a privilege management service, a user management service, a rule management service, a resource management service, and a profile management service.

The framework further comprises a role based administration module. The administration module is a user interface that facilitates management of the metadata through roles comprising at least one of: a Tenant Administrator and a Product Administrator. In an embodiment of the present invention, the administration module further facilitates an unregistered user to browse through the SaaS based multi-tenant web application and associated usage plans, subscribe to associated usage plans and act as a tenant administrator. In an embodiment of the present invention, the administration module further facilitates the tenant administrator to customize workflow associated with the features of the SaaS based multitenant web application. In an embodiment of the present invention, the administration module further facilitates the tenant administrator to perform at least one of: management of users associated with the tenant, entitlement management, privilege management, tenant customization, view bills based on usage of the features associated with the SaaS based multitenant web application, pay bills, and define custom rules for the SaaS based multitenant web application. In an embodiment of the present invention, the administration module further facilitates the product administrator to manage at least one of: subscription plans, pricing of the features, usage of the features, billing for tenants based on usage of the features.

Further, the metadata is stored in a metadata store. In an embodiment of the present invention, the metadata store resides in a shared data model with data associated with the SaaS based multitenant web application. The shared data model facilitates sharing of metadata among a plurality of SaaS based multitenant web applications. In another embodiment of the present invention, the metadata store is isolated data storage. In an embodiment of the present invention, the framework further comprising support for synchronization of metadata and data associated with the SaaS based multitenant web application, between two or more Relational Database Management Systems (RDBMS), and between RDBMS and Not Only Structured Query Language (NoSQL). The framework further comprises support for horizontal partitioning of the metadata in accordance with multiple instances of the schema associated with the metadata.

Further in embodiments of the present invention, the framework facilitates identification of tenants using at least one of: a Uniform Resource Locater (URL) mode and a user login mode. The framework comprises support for enablement of the framework through at least one of: a runtime mode and consumption using an API. The framework further comprises support for integration of the framework with at least one of: a private data center, Platform-as-a-Service (PaaS), and Infrastructure-as-a-Service (IaaS). The framework further comprises support for plurality of extensible data contracts. The framework further comprises plurality of tenant aware components for implementing development of a plurality of customized SaaS based multi-tenant web applications. The framework further comprises support for decoupled and extensible architecture facilitating replacement of a component associated with the framework with a plurality of customized components. The framework further comprises support for at least one of: per-request initialization and per-application initialization of the framework. The per-request initialization facilitates stateless initialization of the framework and per-application initialization facilitates stateful initialization of the framework. The framework further comprises components for custom error handling, wherein the components are provided with context information associated with nature of error associated with the framework. The framework further comprises a templates module configured to provide a plurality of templates to facilitate implementation of multi-tenant architecture. The framework further comprises a guidelines module configured to provide a set of patterns, practices and samples for solving a set of standard and common problems associated with the SaaS based multitenant web application. The framework further comprises support for integration with an Interactive Development Environment (IDE) by providing at least one: project templates, item templates, code snippets, Extensible Markup Language (XML) schema validation, and configuration data.

In another embodiment of the present invention, a method for implementing multitenant architecture is provided. The method comprises hosting a plurality of framework components in a development environment. The framework components comprise framework metadata store, metadata services, and an administration module. The method further comprises creating instances of projects in the development environment. The instances of projects are created using templates, and predefined existing projects for at least one of a green field application and a non Software-as-a-Service (SaaS) based web application. The method furthermore comprises developing a SaaS based multi-tenant web application using the instances of projects. In an embodiment of the present invention, the SaaS based multi-tenant web application is developed by incorporating features for at least one of the green field application and the non SaaS based web application. The method furthermore comprises testing the developed SaaS based multitenant web application for checking functionalities of the features associated with the SaaS based multitenant web application, deploying the SaaS based multitenant web application, and creating tenant specific roles for users associated with a tenant for facilitating access to subscribed features of the SaaS based multitenant web application.

In yet another embodiment of the present invention, a computer program product is provided that comprises a non-transitory computer-readable medium having computer-readable program code stored thereon. The computer-readable program code comprises instructions that when executed by a processor cause the processor to host a plurality of framework components in a development environment. In an embodiment of the present invention, the framework components comprise framework metadata store, metadata services, and an administration module. The processor further creates instances of projects in the development environment. In an embodiment of the present invention, the instances of projects are created using templates, and predefined existing projects for at least one of a green field application and a non Software-as-a-Service (SaaS) based web application. The processor furthermore develops a SaaS based multi-tenant web application using the instances of projects. In an embodiment of the present invention, the SaaS based multi-tenant web application is developed by incorporating features for at least one of a green field application and a SaaS based web application. The processor furthermore tests the developed SaaS based multitenant web application for checking functionalities of the features associated with the SaaS based multitenant web application. The processor furthermore deploys the SaaS based multitenant web application. The processor furthermore creates tenant specific roles for users associated with a tenant for facilitating access to subscribed features of the SaaS based multitenant web application.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The invention provides a framework for implementing multi-tenant architecture for at least one of a green field application and a non Software-as-a-Service (SaaS) based application. The framework comprises a framework services module, a runtime module, a metadata services module, and an administration module. The framework services module is configured to provide a plurality of framework services that facilitate abstraction of SaaS services and crosscutting services for a green field application and a non SaaS based application. Further, the abstraction results in development of a SaaS based multi-tenant web application. The runtime module is configured to automatically integrate and consume the framework services and Application Programming Interfaces (APIs) in a predefined manner to facilitate monitoring and controlling of features associated with the SaaS based multi-tenant web application. The metadata services module is configured to provide a plurality of metadata services that facilitate abstraction of storage structure of metadata associated with the framework, and act as APIs for managing the metadata. The framework further comprises a metadata store that stores the metadata associated with the framework. The administration module is role based and is a user interface that facilitates management of the metadata through roles comprising at least one of a Tenant Administrator and a Product Administrator.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
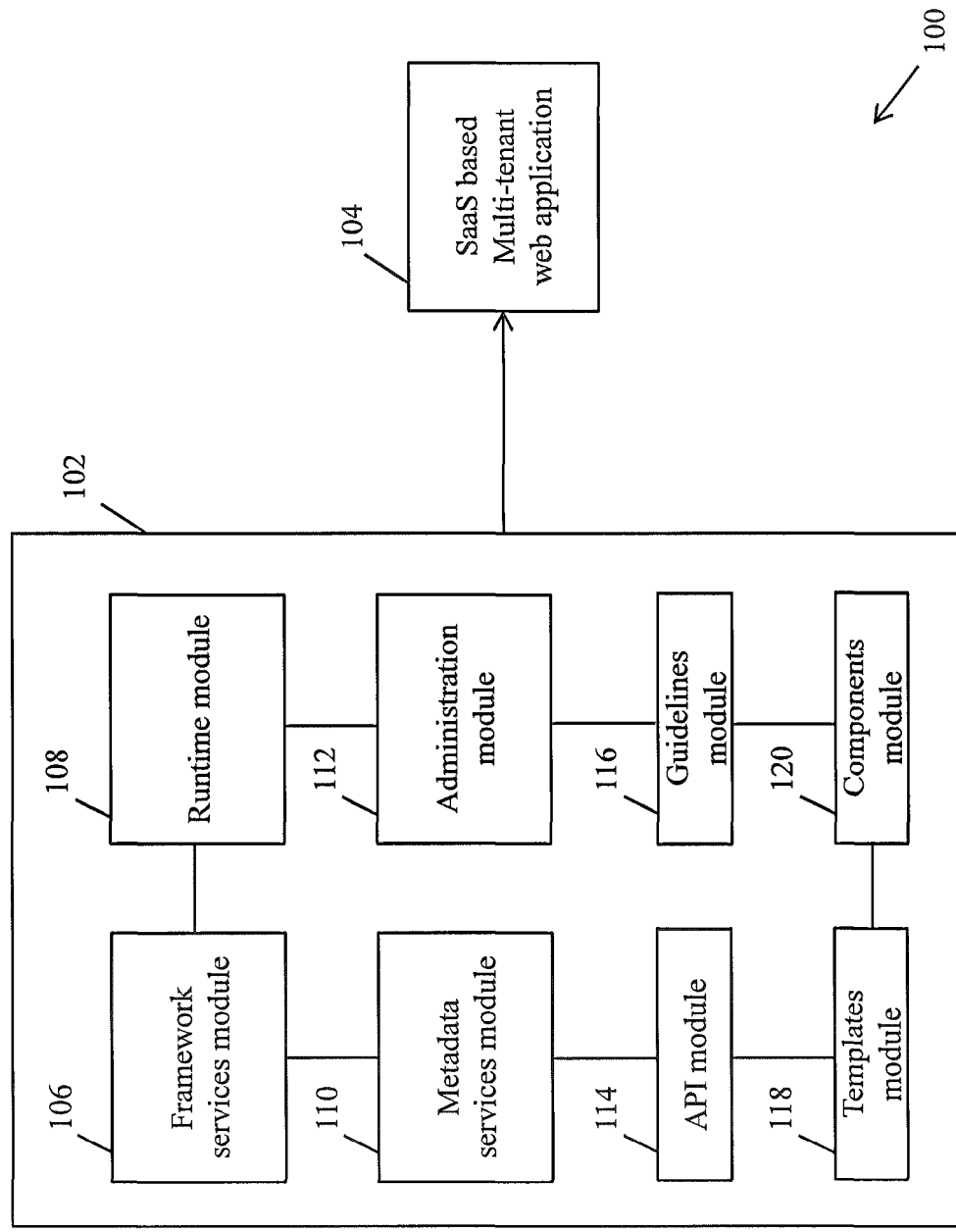
FIG. 1 illustrates a system for developing a SaaS based multi-tenant application in accordance with an embodiment of the present invention.

FIG. 1 illustrates a system 100 for developing a SaaS based multi-tenant application in accordance with an embodiment of the present invention. The system 100 comprises a framework 102 and a multi-tenant web application 104. The framework 102 further comprises a framework services module 106, a runtime module 108, a metadata services module 110, an administration module 112, an Application Programming Interface (API) module 114, a guidelines module 116, a templates module 118, and a components module 120. In embodiments of the present invention, the framework 102 may be hardware or software, or hardware with embedded software or a firmware that is configured to facilitate implementation of multi-tenant architecture. Multi-tenant architecture is an architecture in which a single instance of a software application runs on a SaaS vendor's servers and serves multiple customers or tenants. In an embodiment of the present invention, the framework 102 may facilitate development of a green field application that supports multi-tenant architecture. A Greenfield application is a new or a fresh application under development. In another embodiment of the present invention, the framework 102 may facilitate development of a customized SaaS based multi-tenant web application supporting multi-tenant architecture. In yet another embodiment of the present invention, the framework 102 may facilitate implementation of multi-tenant architecture for a non-SaaS based web application.

Further, in an embodiment of the present invention, the framework 102 may facilitate implementation of a multi-tenant architecture in which a SaaS vendor may run a single instance of a software application on a server associated with the SaaS vendor. Further, the single instance of the software application may serve each customer or tenant of a plurality of tenants. The single instance of the software application may provide a unique user experience and feature set for each tenant. The authorization and security policies provided by the framework 102 may ensure that each tenant's data is kept separate from that of other tenants. The authorization and security policies provided by the framework 102 may further ensure from the end user's perspective, that there is no indication that the software application instance is being shared among multiple tenants. In another embodiment of the present invention, the framework 102 may facilitate implementation of a multi-tenant architecture in which the SaaS vendor may host multiple tenants on a server farm of identical software instances with each tenant's data maintained separately. The identical software instances may provide a unique user experience and feature set for each tenant.

In embodiments of the present invention, the framework 102 supports three categories of roles based on the usage of the framework 102. The first role is that of 'Developers'. The developers are the direct users of the framework 102 who configure and access the framework services module 106, the runtime module 108, the metadata services module 110, the administration module 112, the API module 114, the guidelines module 116, the templates module 118, and the components module 120 to develop a SaaS based multi-tenant web application or implement multi-tenant architecture for a non-SaaS based web application. In embodiments of the present invention, to implement the multi-tenant architecture, the developers perform plurality of steps including, but not limited to, hosting the framework components in a development environment, creation of projects in the development environment, development of Line of Business Applications (LOB) with features identified by the SaaS provider, and deployment of the SaaS based multi-tenant web application. In an exemplary embodiment of the present invention, the LOB may be banking and the features or business functionalities associated with the LOB application may include, without any limitation, balance enquiry, funds transfer, credit card payment, utility bill payment, loan application, and pre-paid mobile recharge. Further, in embodiments of the present invention, the framework 102 facilitates implementation of the multi-tenant architecture by abstracting standard features, for the non-SaaS based web application or for the Greenfield application, that are required for implementing SaaS and in turn implementing the multi-tenant architecture. Abstracting the standard features facilitates the developers to work on the business functionalities or features of the multi-tenant web application and accelerate the development or implementation of the standard features for the SaaS based multi-tenant web application.

In an embodiment of the present invention, the framework services module 106 is a service side component that may be hardware or software or hardware with embedded software or a firmware that is configured to provide a plurality of framework services. The plurality of framework services may include, without any limitation, context creation service, metering service, profile details service, logging service, notification service, membership service, and rule evaluation service. Further, the framework services may be grouped into SaaS services and services implementing crosscutting concerns for an application. In an embodiment of the present invention, crosscutting concerns are those aspects of a program code that may affect other parts of a system or an entire application. These codes are generally centralized at one location so that one has to update the relevant code in one location rather than updating it at multiple places. Once the code is updated in the central location, the behavior is reflected in the entire system or application. Further, the framework services facilitate abstraction of the SaaS services and the services associated with cross-cutting concerns for the green field application and the non SaaS based web application resulting in development of SaaS based multi-tenant web application.

In an embodiment of the present invention, the runtime module 108 is a client side component that may be hardware or software or hardware with embedded software or a firmware that is configured to automatically integrate the framework services and Application Programming Interfaces (APIs) and consume or abstract them in a predefined manner to monitor and control the execution of features of the SaaS based multi-tenant web application. In an embodiment of the present invention, the runtime module 108 gets integrated with the underlying framework 102's technology and enables the framework API in a predefined manner across the technologies for enabling the Unified API.

In embodiments of the present invention, the metadata services module 110 may be hardware or software or hardware with embedded software or a firmware that is configured to provide a plurality of metadata services. The metadata services facilitate abstraction of storage structure of metadata associated with the framework 102 and also act as APIs for managing the metadata. In embodiments of the present invention, the metadata services may include, without any limitation, an application management service, a subscription management service, a package management service, a type customization service, a privilege management service, a user management service, a rule management service, a resource management service, and a profile management service. Further, in an embodiment of the present invention, the framework metadata (hereinafter interchangeably referred to as metadata) is a descriptive model of data that the framework 102 requires for handling configuration, customization and statistics. The structural model of the metadata is a metamodel. The metamodel is a set of objects that describe a domain model. Further, the framework metadata may be stored in any persistence store, referred to as metadata store, with its schema matching to the metamodel. The framework metadata further comprises configuration metadata, customization metadata and statistics metadata for handling configuration, customization and statistics respectively. The configuration metadata stores the configuration details associated with the SaaS based multi-tenant web application and the tenants. The configuration details associated with the SaaS based multi-tenant web application comprise details related to features, data types, extensible types, injection points, subscription plans, and pricing details. The configuration details associated with the tenants comprise details related to the users and the details related to the tenant's subscriptions. The subscription detail of a tenant comprises information related to the roles and entitlement to the features of the SaaS based multi-tenant web application.

The customization metadata stores the details associated with customizations for the LOB application and the tenant. The application customization maintains the details related to the application level notifications, default resources, default profile data, default extensible fields, default validations, default rules and schedules for maintenance. The tenant customization persist the same set of details as the application customization metadata, but tenant customization is applicable under the scope of tenant and the subscription. The statistical metadata stores the data generated by the services facilitated by the runtime module 108 including, but not limited to, usage metering service, logging service, tracking service, notification service, and monitoring service.

In embodiments of the present invention, the API module 114 may be hardware or software or hardware with embedded software or a firmware that is configured to provide a plurality of APIs for executing different functionalities of the framework 102 programmatically. The APIs may be categorized as APIs on the client side and on the service side. On the client side, the APIs associated with the runtime module 108 provide access to the client side services based on a calling code. Then the required client side service APIs are invoked on these service objects. On the service side, there are APIs associated with the framework services module 106 and APIs for metadata management. The metadata management APIs allow a calling code to manipulate the framework metadata programmatically. The APIs associated with the framework services module 106 facilitate the components of the runtime module 108 to connect to the metadata. Furthermore, there are APIs associated with reporting services that provide statistical information to the calling code.

In embodiments of the present invention, the guidelines module 116 may be hardware or software or hardware with embedded software or a firmware that is configured to provide a set of patterns, practices and samples for solving a set of standard and common problems associated with the SaaS based multi-tenant web application. The guidelines may be available as user guides for the developers and may facilitate the developers to determine the tradeoffs between including, but not limited to, manual or automatic integration of the framework 102, stateful or stateless initialization of the framework 102, tenant identification using Uniform Resource Locater (URL) or user login, different deployment options, using local or hosted metadata services, using isolated or co-existing metadata storage, configuring the framework 102 with bootstrapper or with external configuration.

Further, the framework 102 provides a support for Rapid Application Development (RAD) by allowing the developers to develop business functionalities of a web application with automatic integration of the SaaS functionalities by the runtime module 108 externally. The framework 102 further facilitates the developers to control SaaS functionalities invocation by leveraging the manual integration using APIs. Further, the framework 102 allows the user to make choices and the tradeoffs decisions on a case to case basis taking into consideration the complexity, performance and the boundaries.

In embodiments of the present invention, the templates module 118 may be hardware or software or hardware with embedded software or a firmware that is configured to facilitate implementation of multi-tenant architecture by providing templates to the developers. The templates provide a development experience that is familiar to the developers and thereby accelerate implementation of the multi-tenant architecture.

In embodiments of the present invention, the components module 120 may be hardware or software or hardware with embedded software or a firmware that is configured to provide customizable and extensible components to implement the multi-tenant architecture. In embodiments of the present invention, the customizable and extensible components may include, without any limitations, bootstrappers, tier-specific object lifetime management, and context data exchange.

Further, the second role that is supported by the framework 102 based on its usage is that of the 'Tenant Administrator'. In an embodiment of the present invention, the tenant administrator accesses the administration module 112 to perform various activities within scope of the tenant (enterprise) including, but not limited to, management of users associated with the tenant, tenant customization, business specific validations, and privilege management. The administration module 112 is a role based self service portal or a user interface. Further, the tenant administrator may also change subscription plans and may view and/or pay bills created for them based on usage of the features associated with the SaaS based multi-tenant web application. The administration module 112 further facilitates the tenant administrator to define custom rules for the SaaS based multi-tenant web application to which the tenant is subscribed. In an embodiment of the present invention, the administration module 112 further facilitates a role 'Anonymous' or 'unregistered'. The unregistered role is one which provides access rights to browse through the SaaS based multi-tenant web application to view its details, view associated subscription plans, compare subscription plans and act as a tenant administrator upon receiving login credentials from the SaaS provider.

Furthermore, the third role supported by the framework 102 based on its usage is that of 'Product administrator'. The product administrator acts as a custodian of the deployed SaaS based multi-tenant web application and manage subscription plans, pricing of the features, usage of the features, billing of tenants based on the usage of the features. In an embodiment of the present invention, the product administrator accesses the administration module 112 to upload the framework metadata as an XML file generated by metadata exporter tool. The metadata exporter tool facilitates the product administrator to import the framework metadata from the SaaS based multi-tenant web application. In embodiments of the present invention, the framework metadata may include, without any limitation, details of the features, extensible types, injection points, object alias and their feature mapping for automatic rule evaluation.

In an embodiment of the present invention, the framework 102 may be developed in Microsoft®.NET™ and related technologies using Windows Communication Framework (WCF), Silverlight, C#, ASP.NET™, Model-View-Controller (MVC), and Entity Framework and utilizes SQL Server® 2008 R2 as a database. In embodiments of the present invention, the framework 102 comprises support for integration with a private data center, a Platform-as-a-Service (PaaS), and an Infrastructure-as-a-Service (IaaS). Further, be it a private data center or IaaS or PaaS, the framework 102 is designed to get seamlessly integrated with the underlying environment without causing any vendor lock in. Further, in an embodiment of the present invention, the framework 102 may be configured, enabled and deployed by an organization that plans to implement multi-tenant architecture for the non-SaaS based web application associated with the organization. In another embodiment of the present invention, the framework 102 may be configured, enabled and deployed by an Information Technology (IT) company that provides services like implementation of SaaS and multi-tenant architecture to the organization to which the non-SaaS based web application is associated with. In yet another embodiment of the present invention, the framework 102 may be deployed by a SaaS delivery company hosting SaaS based applications associated with plurality of organizations. Further, in an embodiment of the present invention, the framework 102 may comprise support for stateful or per-application initialization mode. In the per-application initialization mode the framework 102 initializes when the application is loaded into the memory for the first time thus, making it a stateful initialization. In another embodiment of the present invention, the framework 102 may comprise support for stateless or per-request initialization mode. In the per-request initialization mode the framework 102 is enabled for every single request and thus, making it a stateless initialization. In other words, the framework 102 supports principles of both stateful and stateless architectures. The choice of the two architectures is made configurable by allowing the architect to select an architecture based on the nature of the web application 104 and other non functional requirements. The framework 102 can thus support a small web application as well as a large distributed application by adhering to the requirements of the state management and avoiding non critical complexities.

Further, in an embodiment of the present invention, the framework 102 comprises support for enablement of the framework 102 through runtime mode. In the runtime mode of enablement, the framework 102 components are put in place for performing various activities with the help of a bootstrapper. In another embodiment of the present invention, the framework 102 comprises support for enablement of the framework 102 through consumption using an API. Further, in an embodiment of the present invention, the framework 102 comprises support for decoupled and extensible architecture. The decoupled and extensible architecture facilitates replacement of a component associated with the framework 102 with a plurality of customized components. The decoupled and extensible architecture of the framework 102 further facilitates extensibility and customization, and freedom to replace any of the existing framework components with new and compatible components without recompiling the framework 102 or the web application 104. The framework 102 can co-exist with other frameworks and can seamlessly communicate with them for any of the crosscutting concerns. The framework 102 further does not leave any dependency with the other frameworks. Further, any framework component can be customized or extended without impacting other components. The framework 102 integrates seamlessly with different environments without any change to the core source code and only by way of extending the specific components interacting with the underlying environment. Further, a predefined or standard way of consuming the framework is provided across different tiers or technologies that facilitate seamless development experience, maintainability, and reduction in the learning curve. In an exemplary embodiment of the present invention, associating a feature attribute metadata with an entity elevates an atomic business functionality to participate in different framework services in a predictable way irrespective of the underlying tier and technology.

In an embodiment of the present invention, the framework 102 provides built in support for flexible data contracts that can be extended without any sub-classing. The extensible data contract specification does not require any predefined inheritance and thus, can be implemented over any of the existing data contracts without changing any object relations. Further, in embodiments of the present invention, querying of extensible entities is connected closely to the underlying standard querying logic. This facilitates the developers in eliminating the need of writing a code to fetch the data using the known in the art Object-Relational Mapping (ORM).

In an embodiment of the present invention, the framework 102 further provides a dynamic configurability. The configurations can be provided either in an XML format or any other software code. The dependency of configuration is avoided by externalizing the configurations using a bootstrapper. The two approaches (i.e. XML and software code) do not require the configurations to be combined with the functional implementation at any place of the framework 102 or the multi-tenant web application 104.

The SaaS based multi-tenant web application 104 (hereinafter interchangeably referred to as web application 104) is an output of the framework 102. In an embodiment of the present invention, the web application 104 may be a user interface enabled web application. In another embodiment of the present invention, the web application may incorporate various web services that are distributed over web. In yet another embodiment of the present invention, the web application 104 may be a rich internet application. In exemplary embodiments of the present invention, the web application 104 may be, without any limitation, a Human Resource (HR) application, a Customer relationship management (CRM) application, an accounting application, and a banking application. Further, in an embodiment of the present invention, the framework 104 facilitates hosting of the web application 104 in a Virtual Private Data Center (VPDC) built around VMware's vSphere cloud operating system. In another embodiment of the present invention the framework 102 facilitates hosting of the web application 106 in a Virtual Private Cloud (VPC). In yet another embodiment of the present invention the framework 102 facilitates hosting of the web application 106 in public clouds like, without any limitation, Amazon Web Services (AWS) Elastic Compute Cloud (EC2), Microsoft® Windows® Azure Platform as a Service (PaaS), AWS Elastic Beanstalk, and Elastic Sky X (ESX) based Vmware installations. Further, be it a private data center or an IaaS or a PaaS, the framework 102 is designed to get seamlessly integrated with the underlying environment without causing any vendor lock in. This facilitates the hosting of the web application 104 in a hybrid environment without making any change to the core source code of the web application 104. Further, in cases where the web application 106 is a single process application or a distributed application or a sample application or a large enterprise application with plurality of lines of code and multiple integrated systems, the framework 102 may facilitate enabling SaaS on most of the .NET applications irrespective of the size or complexity or distribution of the web application 104.

Further, the framework 102 is built to enable tenant awareness to provide seamless integration of SaaS functionalities irrespective of the distribution of the web application 104. The integration of the framework 102 with different kinds of distributions can be managed with changes in the configurations of the framework 102. Further, the enablement of the framework 102 is easy and is designed to work on same principles across different platforms and technologies. Also, unit testing (a framework 102 enabled solution) does not require services to be hosted and thus, the services can be simulated as local services. The framework 102 also avoids any requirement of reengineering on migration from a centralized single process application to n-tier distributed application.

Further, as described above, upon development and hosting of the SaaS based multi-tenant web application 104, the framework 102 facilitates subscription of features of the web application 104 to the tenants, metering of usage of features and quota management as explained in FIG. 2 below.

Figure 2:
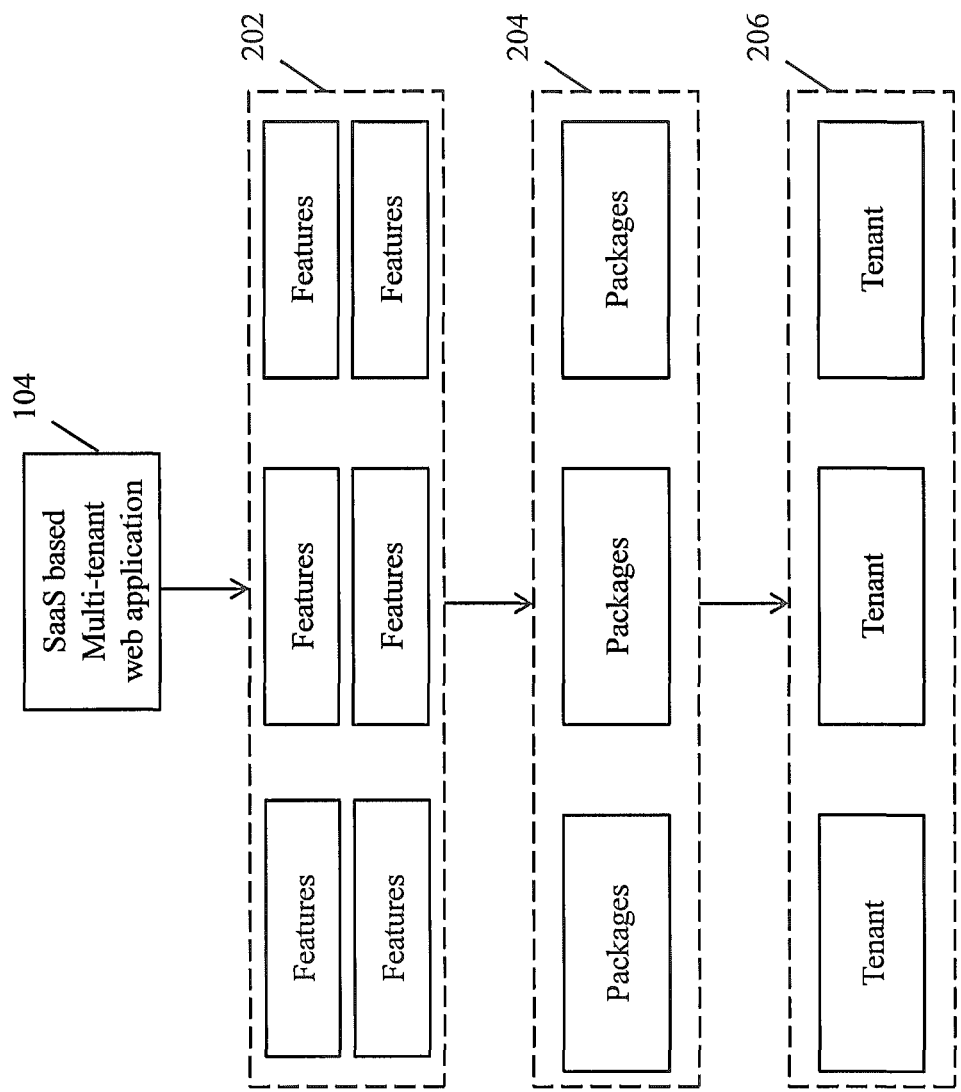
FIG. 2 is a block diagram depicting subscription of features of the SaaS based multi-tenant web application to a plurality of tenants in accordance with an embodiment of the present invention.

FIG. 2 is a block diagram depicting subscription of features of the SaaS based multi-tenant web application 104 to a plurality of tenants in accordance with an embodiment of the present invention. FIG. 2 depicts the web application 104, features 202 of the web application 104, a plurality of subscription packages 204 and a plurality of tenants 206. In an embodiment of the present invention, the features 202 are atomic business functionalities of the web application 104. In exemplary embodiments of the present invention, the features 202 may be, without any limitation, balance enquiry, funds transfer, credit card payment, utility bill payment, loan application, and prepaid mobile recharge. Further, the framework 102 facilitates grouping of the features 202 into subscription packages 204 using an entity 'subscription feature group' or 'subscription groups' (not shown in FIG. 2). In an exemplary embodiment of the present invention, for banking as a LOB, the features 202 may be grouped into subscription packages 204 including, but not limited to, account information, credit cards, and mutual funds. The groups for the various features 202 may be identified by the SaaS provider. Upon grouping of the features 202, the framework 102 facilitates association of pricing and quota that is decided by the SaaS provider. It may be apparent to a person of ordinary skill in the art that pricing and quota of features 202 may be applied to a single feature, a group of features 202, or at a subscription plan level. The framework 102 then facilitates subscription of packages 204 to the tenants 206. Users belonging to the tenants 206 are then authorized to access the features 202 under subscribed plans and packages 204. Further, the tenant administrator can configure the entitlement of the features 202 associated with the subscription package 204 by creating roles and associating the features 202 with each of created roles. Associating the created roles with the packages 204 facilitates a granular control over the access rights at the level of atomic business functionality with the corresponding roles.

After the tenants 206 are subscribed to the features 202, framework 102 facilitates metering of the usage of each of the features 202, transfer of data corresponding to the features 202, and usage time of the features 202. In embodiments of the present invention, the framework 102 facilitates recording and monitoring of every single use of designated business functionality associated with the web application 104. In other words, the framework 102 facilitates metering and management of quota limits at a granular level of the implementation. The framework 102 further facilitates triggering actions that may be taken if the access to the web application 104 reaches a predefined usage limit for each tenant and/or user. The triggering actions have been described in detail in conjunction with FIG. 6. The framework 102 further facilities metering a request and a corresponding response of a particular request-response cycle and record each feature usage within the cycle using predefined co-relations between the requests and responses. Further, the framework 102 enables the analytics to visualize the end to end activities within a request response cycle with different permutations and combinations. In an embodiment of the present invention, the metering parameters are customizable. Further, based on the metering and the subscription packages 204, the framework 102 facilitates invoicing the tenants 206.

Figure 3:
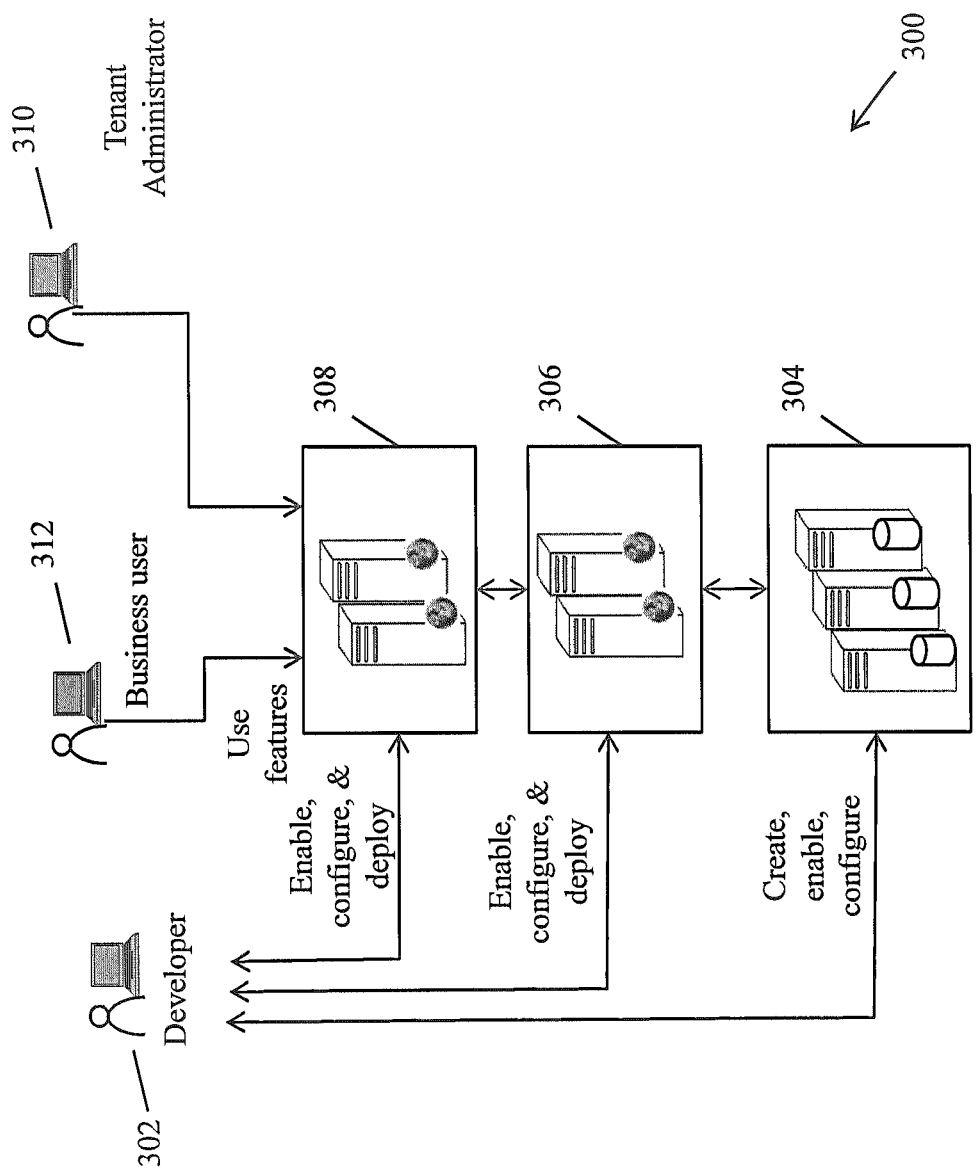
FIG. 3 is block diagram of a system depicting deployment of a framework and the SaaS based multi-tenant web application in accordance with an embodiment of the present invention.

Referring now to FIG. 3 which is block diagram of a system 300 depicting deployment of a framework and a SaaS based multi-tenant web application in accordance with an embodiment of the present invention. The system 300 shows a developer 302 at the SaaS provider's end involved in creating, enabling and configuring a metadata and business data store 304. In an example, the metadata and business data store 304 may be created, enabled and configured using Microsoft® SQL Server® over a Windows® server, or a virtual machine. The developer 302 further enables, configures and deploys a framework services module, an application services module and a runtime module on a load balanced application server farm 306. For example, the server farm may include Microsoft® Windows® Server, a .NET® server, a physical server, a virtual machine or an Internet Information Server (IIS). The developer 302 furthermore enables, configures and deploys a front end comprising the web application, the runtime module, and the administration module in a load balanced server farm 308. In examples, the load balanced server farm may include Microsoft® Windows® Server, a .NET® server, a physical server, a virtual machine or an Internet Information Server (IIS). In embodiments of the present invention, in order to create, enable, configure, and deploy the metadata and business data store 304, framework services module, the application services module and the runtime module, front end, and the administration module the developer 302 may use a Microsoft® Visual Studio® project, templates, snippets, XML Schema Definitions (XSD), scripts and tools. In other words, the framework provides the IDE integration including, without any limitation, project templates, item templates, code snippets, IntelliScene support, XML schema validation, default configuration data. To accelerate the process, the developers can select an appropriate project template and can initiate writing of code for their business. The metadata can be exported to the administration module with the help of a tool selected by clicking on an icon associated with the tool. After the administration module has been deployed, a tenant administrator 310 may access the administration module to subscribe to the features of the web application, create metadata, create roles for the users to subscribe to the features of the web application 104, create business users 312, and to access features usage reports. The created business users 312 may then use the features of the web application using the front end. The front end acts as a user interface for the users.

Figure 4A:
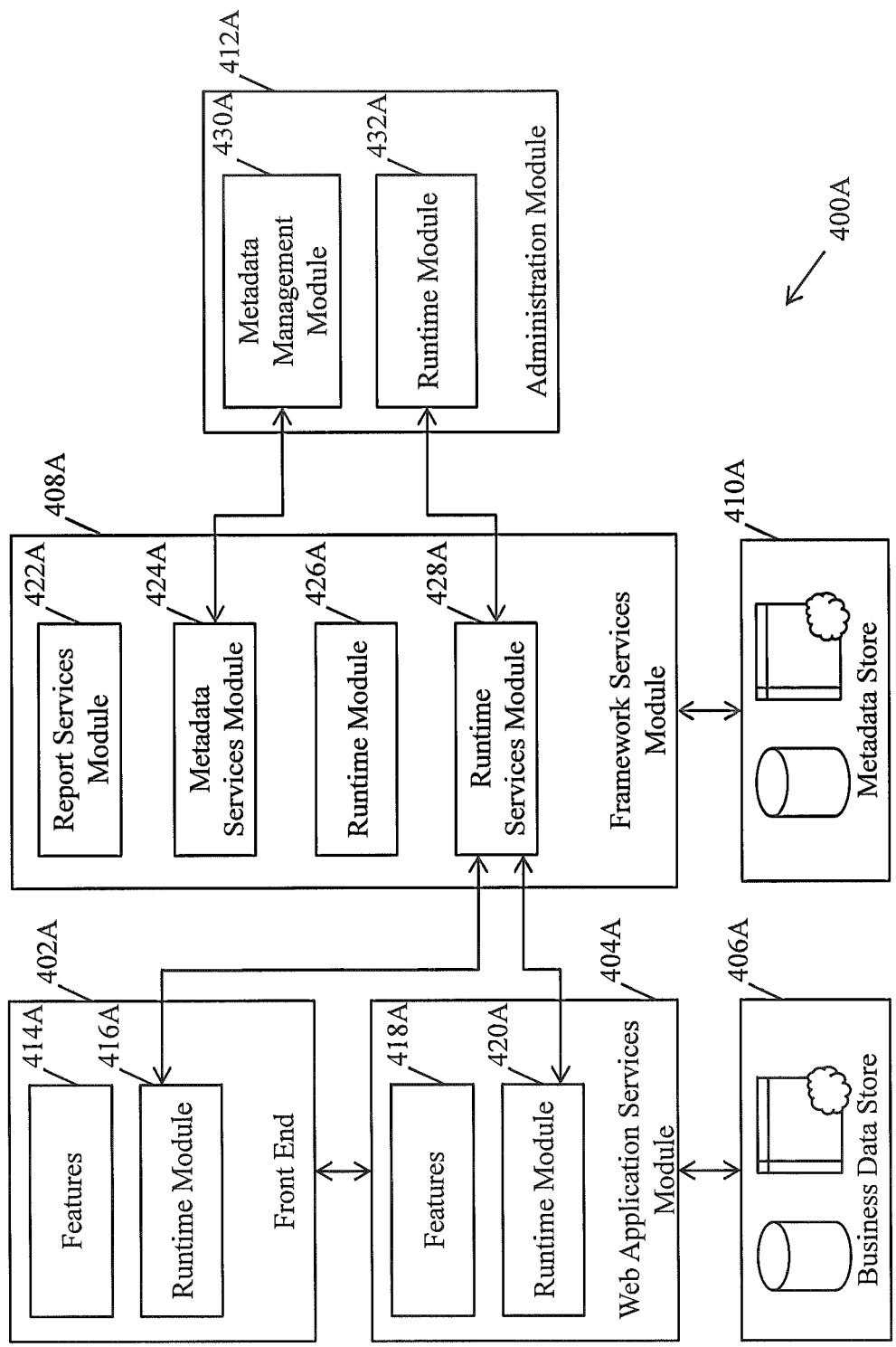
FIGS. 4A and 4B are block diagrams illustrating an overview of frameworks for implementing multi-tenant architecture in accordance with different embodiments of the present invention.
Figure 4B:
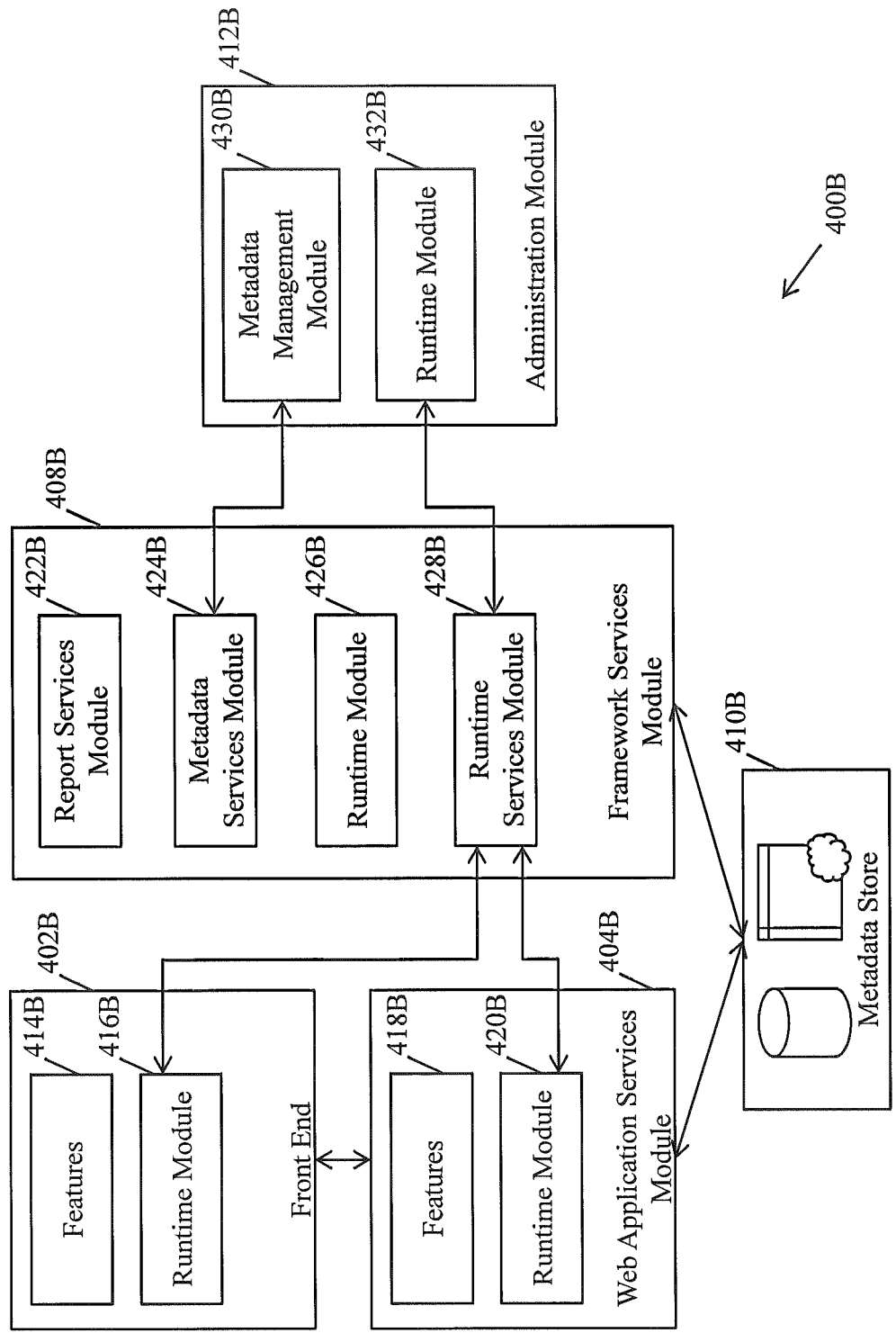

FIGS. 4A and 4B are block diagrams illustrating an overview of frameworks 400A and 400B for implementing multi-tenant architecture in accordance with different embodiments of the present invention. FIG. 4A depicts the framework 400A with an isolated storage for metadata and data associated with a web application. FIG. 4B depicts the framework 400B with a shared storage for the metadata and the data associated with the web application. As FIGS. 4A and 4B comprise identical elements and in order to maintain brevity, FIG. 4B has not specifically described in the present application however, has been referred as required.

Referring to FIG. 4A, the overview of the framework 400A depicts a front end 402A, a web application services module 404A, a business data store 406A, a framework services module 408A, a metadata store 410A, and an administration module 412A. The front end 402A further comprises features 414A and a runtime module 416A. The web application services module 404A comprises web application 418A with associated features 414A and a runtime module 420A. The framework services module 408A further comprises a report services module 422A, a metadata services module 424A, a runtime module 426A, and a runtime services module 428A. The administration module 412A comprises a metadata management module 430A and a runtime module 432A.

The runtime modules 416A, 420A, 426A, and 432A are similar to the runtime module 108 as described in conjunction with FIG. 1 and therefore, hereinafter will be interchangeably referred to as only runtime module. The runtime module acts as a core of the framework 400A and is communicatively coupled to the runtime services module 428A to provide a set of SaaS and crosscutting services. The details of the runtime module have been depicted in FIG. 5.

Figure 5:
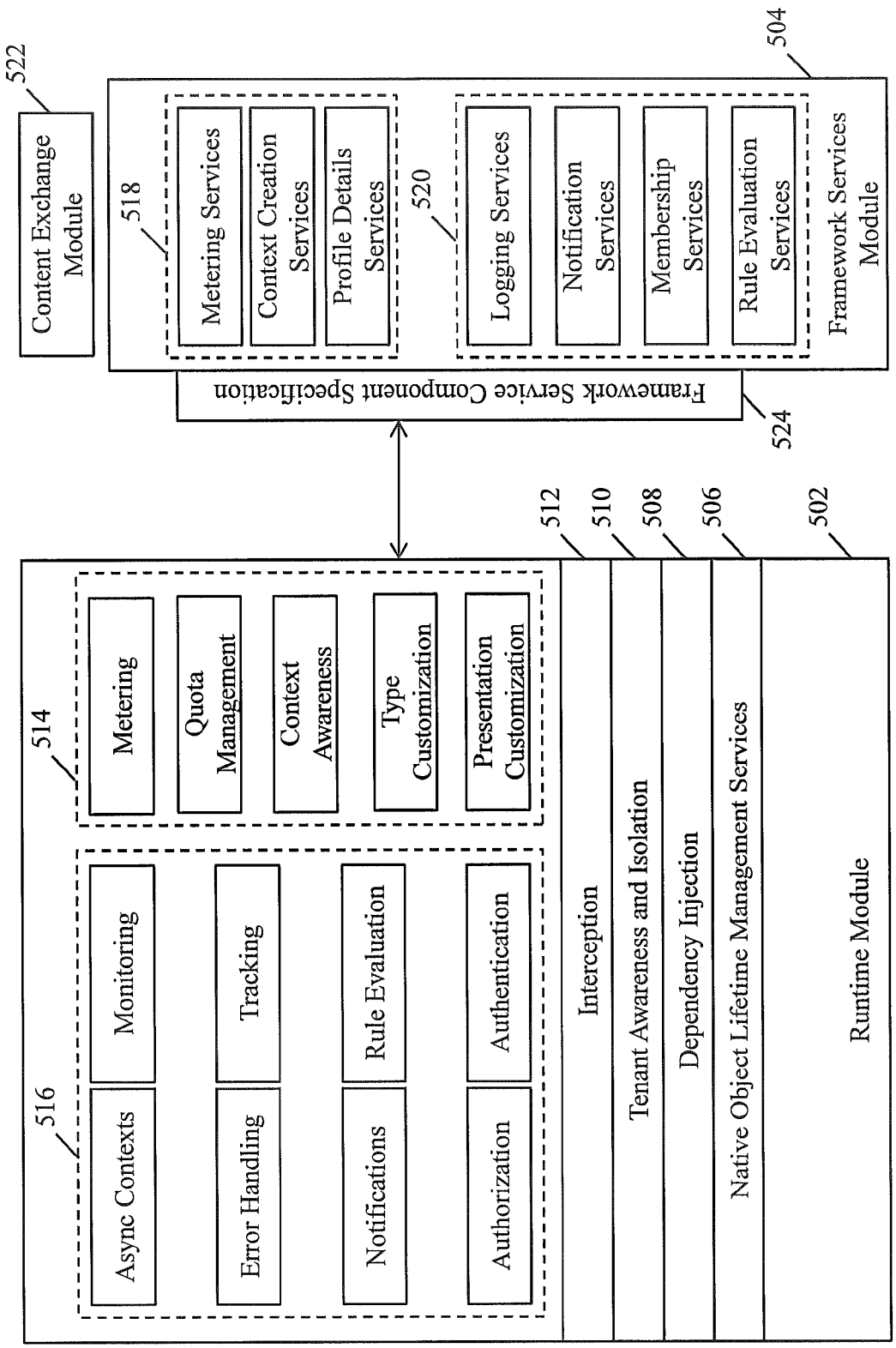
FIG. 5 is a block diagram illustrating a runtime module communicatively coupled to a framework services module in accordance with an embodiment of the present invention.

FIG. 5 is a block diagram illustrating a runtime module 502 that is communicatively coupled to a framework services module 504 in accordance with an embodiment of the present invention. As illustrated in FIG. 5, the runtime module 502 uses native object lifetime management service 506 for controlling lifetime of objects. In an embodiment of the present invention, the native object lifetime management service 506 provides an appropriate lifetime management extension that connects life span of an object with the underlying technology of the framework 400A to control the lifetime of the object. In other words, the framework 400A comprises appropriate lifetime management extensions connecting the life span of an object with the underlying technology. The underlying technology can then manage the life span of the object. The native object lifetime management of the framework 400A facilitates least memory footprints. In an embodiment of the present invention, the lifetime management extension that connects life span of an object with the underlying technology of the framework 400A helps in reducing memory usage and facilitates the framework 400A to work in a highly decoupled manner. In an embodiment of the present invention, the native object lifetime management service 506 ensures via the DI container that the objects which are employed across multiple contexts or objects which are shared in one or more contexts are free from any dependency.

When registering a type or an object with the dependency container, a lifetime manager is also attached by specifying a token uniquely denoting the type of lifetime management. In an exemplary embodiment of the present invention, the use of the token for resolving dependencies from the dependency container facilitates decoupled implementation of the object lifetime manager provider service 506.

A DI service 508 is made on top of native object lifetime management services 506. The DI service 508 facilitates abstraction of a dependency injection container for resolving the abstracted framework services. In an embodiment of the present invention, the design of the abstraction of the dependency injection container facilitates integration of a plurality of dependency injection mechanism within the framework 400A. The design of the abstraction enables the developers to select any DI mechanism into the framework 400A without recompiling the web application, even during runtime. In other words, the design of the abstraction is such that it enables the developers to choose any dependency injection mechanisms known in the art to be plugged into the framework 400A, without recompiling the application, even during runtime. Further, the framework 400A co-exists with known in the art DI frameworks and shares their capabilities. The choice of selecting a known in the art DI framework is based on the nature of the web application. The DI is a software design pattern by which one can compose applications while intercepting dependencies and controlling their lifetime. The DI is a subset of Inversion of Control (IoC), involving context enabled lookup, where the IoC is an object oriented programming technique where object coupling is done at runtime (and not at compile time) using an assembler object.

Further tenant awareness and isolation service 510 is built above the DI service 508. The tenant awareness and isolation service 510 facilitates tenant awareness and isolation of data associated with a plurality of tenants by extending state management in an underlying tier using the native object lifetime management service 506 and isolating data associated with the plurality of tenants within the runtime module 502. In other words, the tenant awareness and isolation of tenant data are built into the runtime module 502 by extending the state management in the underlying tier using the object lifetime management and isolating the tenant data within the runtime module 502. This facilitates the developer to do nothing specific in connection with the tenant awareness and isolation of tenant data. In an embodiment of the present invention, to apply tenant awareness to the data a link table is created connecting each entity and the tenant with either physical or logical relation. The creation of the data link table and the physical or logical relations facilitate existing tables' migrations without any modification. In another embodiment of the present invention, an additional metadata table for entities is added. The metadata table is further linked to the tenant physically or logically. The additional metadata table facilitates tenant awareness by avoiding a multiple link table between each entity and the tenant. Further, the tenant awareness is deeply integrated with the runtime module 502 ensuring the automatic access rights management at a higher level even before a particular part of the code gets executed. The runtime module 502 ensures all access to atomic business functionalities and resources is brought under the scope of the tenant automatically. Also, the runtime extensions apply the data access and field level access restrictions by injecting the required filters at the ORM to enforce isolation of the data.

On top of tenant awareness and isolation service 510 is an interception service 512. In an embodiment of the present invention, the interception service 512 facilitates abstraction of an interception runtime for enabling the IoC and allowing the interception layer to connect to a plurality of interception providers. In an exemplary embodiment of the present invention, the interception layer can connect to any of the interception providers known in the art or that may emerge in future. Further, the framework 400A can co-exist with known in the art frameworks and can consume their services.

Further, the runtime module 502 comprises a set of SaaS services 514 and a set of crosscutting services 516. The framework services module 504 includes a set of SaaS services 518 and a set of crosscutting services 520. In an embodiment of the present invention, the runtime module 502 communicates with the framework services module 504 for connecting to the SaaS services 518 and the cross cutting services 520. The framework services module 504 implements a framework service component specification 524 for enabling the framework services (SaaS and crosscutting) to be connected to a service client as a local or hosted service. In an embodiment of the present invention, when a framework service is configured as local, the runtime module 502 resolves the framework service using the DI service 508. Further, local context data is shared when the framework service is resolved using the DI as a local service. In another embodiment of the present invention, when a framework service is configured as hosted, the runtime module 502 connects to the framework service as an external service. Further, a component context exchange module 522 is provided that manages bidirectional synchronization of the context data between the runtime module 502 and the hosted framework service. In other words, the framework service component specification 524 allows a service client to connect to a framework service irrespective of whether it is hosted remotely or available locally within the same process. In an embodiment of the present invention, the framework service component specification 524 allows a service client to connect to a framework service when it is hosted remotely. Based on a service component configuration entry, the hosted framework service may be connected using a local proxy such that the endpoint matches the service configuration and entry point matches the configured key. In another embodiment of the present invention, framework service component specification 524 allows a service client to connect to a framework service when it is available locally within the same process. The local framework service is resolved from the dependency injection container by matching the configured key as a unique identifier. Further, the switching between connecting to the local or hosted service does not require any recompilation of code. Further, even if the web application is a centralized application with a single process or a distributed application, enabling the framework 400A is simple and easy with the same principles. Also, a distributed large scale web application can be unit tested as a centralized single process web application by altering a few configurations with the services designed as per the framework service component specification 524.

Further in embodiments of the present invention, the SaaS services 514 in the runtime module 502 may include, without any limitation, a metering service, a quota management service, a context awareness service, a type customization service, and a presentation customization service. The crosscutting services 516 may include, without any limitation, an asynchronized contexts service, a monitoring service, an error handling service, a tracking service, a notifications service, a rule evaluation service, an authorization service, and an authentication service. The SaaS services 518 at the framework services module 504 comprise, without any limitation, a context creation service and a metering service. The crosscutting services 520 comprise, without any limitation, a logging service, a notification service, a membership service, and a rule evaluation service.

In an embodiment of the present invention, the framework services module 504, at the service side, connects the client side runtime module 502 to the metadata for providing the SaaS services 514 and the crosscutting services 516. In an embodiment of the present invention, to facilitate metering and quota management, the metering service and the quota management service at the client side gets connected to the metering service at the service side. The metering service facilitates metering of the usage of each of the features associated with the web application, transfer of data corresponding to the features, and usage time of the features at a granular level. The metering service further facilities metering a request and a corresponding response of a particular request-response cycle and record each feature usage within the cycle using predefined co-relations between the requests and responses. In an embodiment of the present invention, the metering parameters are customizable. In embodiments of the present invention, the monitoring service facilitates recording and monitoring of every single use of designated business functionality associated with the web application. The monitoring service further facilitates triggering actions that may be taken if the access to the web application reaches a predefined usage limit for each tenant and/or user or when the load reaches a level higher than the planned capacity as illustrated in FIG. 6.

Figure 6:
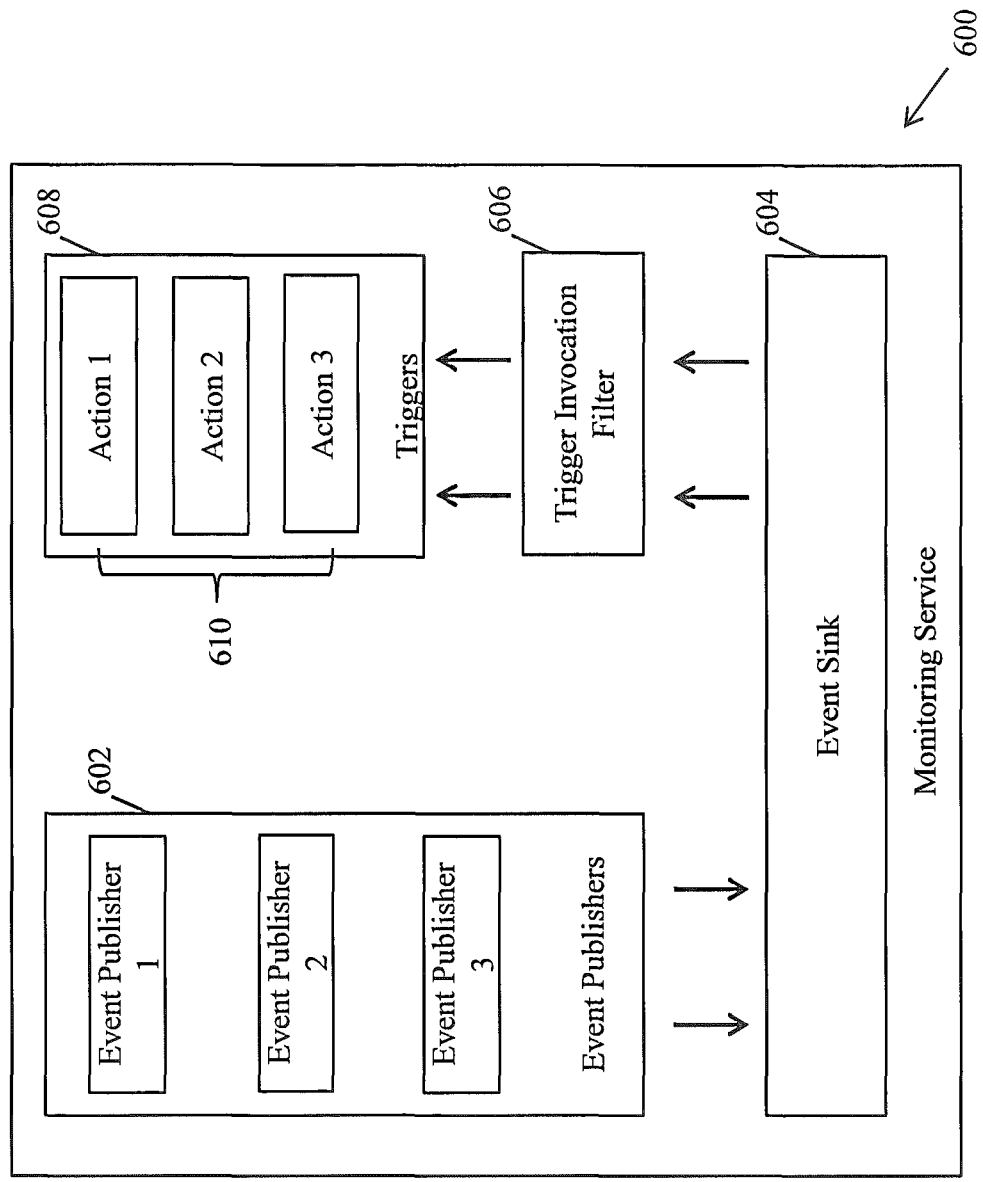
FIG. 6 is a block diagram illustrating a monitoring service in accordance with an embodiment of the present invention.

FIG. 6 is a block diagram illustrating the monitoring service 600 in accordance with an embodiment of the present invention. The monitoring service 600 comprises a set of event publishers 602, an event sink 604, a trigger invocation filter 606, a plurality of triggers 608 and a plurality of actions 610 to be performed for each trigger of the plurality of triggers 608. The event sink 604 acts as an event aggregator and facilitates the event publishers 602 to publish events to a common place. The event sink 604 pushes the events through the trigger invocation filter 606 for storing the configuration details of the triggers associated with each event. Further, corresponding actions registered to each trigger are invoked when a check condition on a trigger returns a matching status. In an embodiment of the present invention, each action may execute a predefined set of instructions. The sequence of execution of the predefined set of instructions may be altered by throwing exceptions. Each action registers a set of exceptions it may throw to break the flow of execution. The actions may be executed in a main thread to enable the actions to stop the execution of the web application, if required, by bubbling the known exceptions. In an embodiment of the present invention, unknown exceptions are logged and ignored. Further, in an embodiment of the present invention, a quota management trigger receives a tenant identification event in each request and queries the usage data to check if the tenant exceeded the usage quota associated with the web application or not. Upon checking the usage quota corresponding actions are invoked accordingly. An action sends a notification to the tenant administrator for the first time a trigger is invoked and another action pushes the user out by bubbling an exception to the runtime module 502 intimating that the usage quota is over.

In an embodiment of the present invention, to facilitate context awareness at the client side, the context awareness service at the client side gets connected to the context creation service at the service side. The context awareness service facilitates loading of different types of context data on the client side. The different types of context data include, but not limited to, user context data, tenant context data, resource context data, subscription context data, and custom type context data. In an embodiment of the present invention, the tenant context data is loaded during a first request from the tenant, when the tenant identification mode is set to URL. In another embodiment of the present invention, when the tenant identification mode is set to login, the tenant context data is loaded if it is not previously loaded, along with the loading of the user context data. Further, most of the context data is loaded on demand enabling lazy loading and support for distribution and scalability. The lazy loading is a software design pattern that allows deferring the initialization of an object until the point at which it is needed.

In an embodiment of the present invention, the runtime module 502 uses the context exchange module 522 to support bidirectional active synchronization or passing of the context data between the service and the service client. The bidirectional active synchronization is facilitated through a virtual channel in each operation invocation across the protocols. In other words, the context exchange module 522 establishes a bidirectional virtual channel across the service and the service client by means of passing the context data without affecting the existing message or data contract and by eliminating the need for altering the service contracts while enabling the multi-tenancy. In an embodiment of the present invention, the passing of the context data is in half duplex mode. In another embodiment of the present invention, the passing of the context data is in full duplex mode. In the full duplex mode of the operation, the context exchange module 522 acts as a live mesh between the service client and the service by synchronizing the states of the configured context objects in a bidirectional manner. Further, the framework 400A empowers the contracts to contain the data required only for business and ensures that a service is consumed only by the users of the subscribed tenants from the authorized clients. The framework 400A further keeps tenant and subscription information away from the contract making them secure, safe and not compromised. Also, the framework 400A allows the seamless propagation of context details from a single custodian and eliminates the requirement of rebuilding the context information at each individual service component. The bidirectional context data synchronization enables the framework 400A to connect to a service as a local service and thus marks the boundary of the service (which demarcates the boundary of the service). The framework 400A further integrates with known in the art approaches for supporting any of the custom requirements. The details of the context exchange module 522 have been disclosed in FIG. 7.

Figure 7:
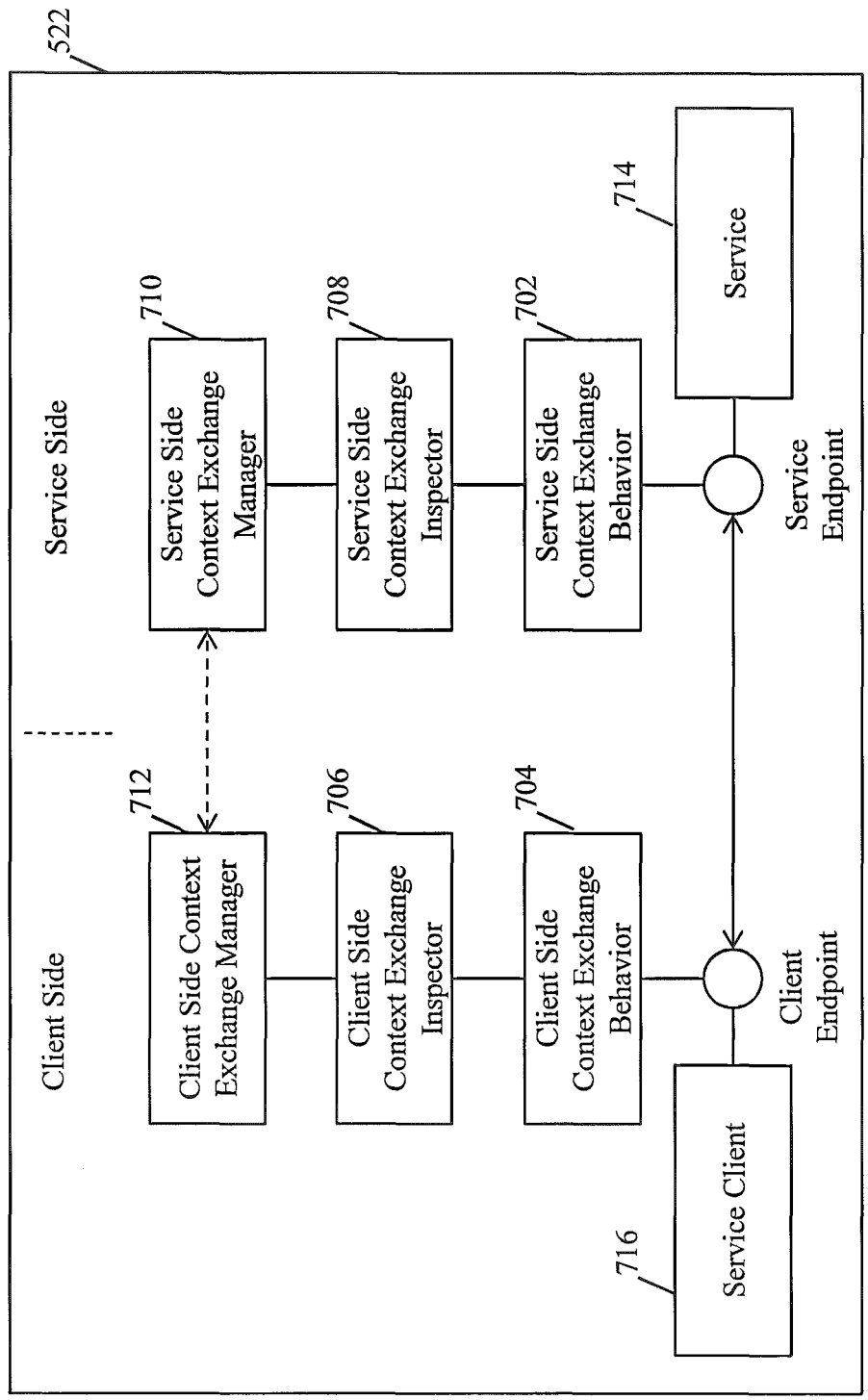
FIG. 7 is a block diagram illustrating a high level context exchange flow in a context exchange module in accordance with an embodiment of the present invention.

FIG. 7 is a block diagram illustrating a high level context exchange flow in the context exchange module 522 in accordance with an embodiment of the present invention. The context exchange module 522 comprises components like, without any limitation, context exchange behavior, context exchange inspector, context exchange manager, context header generator, context provider, and a dependency resolver to facilitate bidirectional active synchronization. The component context exchange behavior is an end point behavior enabled at the end points on both the service 714 and the service client 716.

In an embodiment of the present invention, at the service side the context exchange behavior is enabled as a service side context exchange behavior 702 and at the client side as client side context exchange behavior 704. Further, the context exchange behavior enables the context exchange inspector as a client side context exchange inspector 706 on the client side and as a service side context exchange inspector 708 on the service side for manipulating both the incoming and outgoing messages. At the service side, before sending a message, the service side context exchange inspector 708 attaches the context objects collected from service side context exchange manager 710 to the message header after serialization, compression and encryption. Upon receiving a message on the client side, the client side context exchange inspector 706 collects the serialized context data from the message header, decrypts it and uncompresses it to regenerate transported objects. The client side context exchange inspector 706 then handovers the regenerated transported objects to the client side context exchange manager 712 for appropriate lifetime management.

The context exchange manager acts as the core of the context exchange module 522. The context exchange manager facilitates decision on the required context objects to be transmitted across the client and the service boundary. The service side context exchange manager 710 provides context objects as a lookup of key value pair with value being the object and the key denoting the identifier of the context object to the service side context exchange inspector 708. The service side context exchange inspector 708 on the service side then transmits the context objects to the client endpoint after serialization, compression and encryption. The client side context exchange manager 712 on the client side then collects the deserialized context object lookup from the client side context exchange inspector 706 and copies their states to the local objects resolved from a dependency injection container.

Further in an embodiment of the present invention, the context header generator (not shown in FIG. 7) is a component to convert the lookup of the context objects to the message header and back. The context header generator provides extensibility support for, without any limitation, the serialization mechanism, compression, encryption, and message header generation by segregating the independent logics from the context exchange inspector. The context provider (not shown in FIG. 7) is a component that acts as an ambient store for storing the context objects specific to a request, ensuring the object references. The context exchange manager gets and updates the local context objects from the context provider.

Further in an embodiment of the present invention, the developers configure the service side context exchange behavior 702 and the client side context exchange behavior 704 using a code or an XML configuration. The service side context exchange behavior 702 and the client side context exchange behavior 704 then consume the context data from the context provider both in the service and the service client using the same Unified APIs.

In an embodiment of the present invention, the asynchronized context service provides an update on the state of the asynchronous operations that take place on web. The capabilities to provide information on the states of the asynchronized operations is not there in the ASP.NET based framework. Thus, to provide the update on the state of the asynchronous operations, the asynchronized context service may facilitate the developer to invoke asynchronous operations which results in automatic state awareness of the asynchronous components. In other words, the framework 400A provides the state awareness on asynchronized operations on web that are not provided by ASP.NET frameworks by default. In an exemplary embodiment of the present invention, to facilitate the framework 400A to provide the state awareness on asynchronized operations, the developers can invoke their asynchronized operations through the framework 400A. The asynchronized context service is a runtime component and is not connected to any service on the service side. Further, in an embodiment of the present invention, the asynchronized context service provides components to enable the context awareness on a Multi-Threaded Application (MTA) environment by sharing of a thread specific data across one or more related threads.

Further, in an embodiment of the present invention, to facilitate type or entity customization at the client side, the type customization service at the client side gets connected to the context creation service at the service side. In an embodiment of the present invention, the type or entity customization allows the tenants of the multi-tenant web application to customize the entities by adding additional fields including, but not limited to, predefined business requirements, governance, and reporting. In an embodiment of the present invention, the customization of entities is facilitated by a type extensibility component. The type extensibility component facilitates customization of entities by providing a support for its consumption using a template that is independent of underlying technology of the framework 400A. In other words, the type extensibility is a component that provides an end to end support for its consumption including its storage, data access, service extensible contracts, metadata administration, entitlement, authorization, validation, and rendering using a technology independent template transformed to the underlying technology, without requiring the developers to modify or develop any additional software code. Further, the rendering of controls is made template independent and controlled by feature aware metadata mapping for each fields enabling the automatic rendering of same entities differently for different business functionalities. A variety of storage options may be provided including, without any limitation, field values per schema and field values per entity. Further, the type extensibility supports isolated or co-existing metadata storage with the LoB application storage. Further, the type customization service facilitates persistence of additional fields in the associated data store, presenting them on the user interface with templates and transporting them to other associated processes. In an embodiment of the present invention, the extension field metadata including the custom type details and field definition per tenant may be stored in a different set of table and the field values for each entity is saved in a different table for each entity. In another embodiment of the present invention, the extension field metadata including the custom type details and field definition per tenant may be stored in separated set of table and the field values for each entity is saved in a single table shared among all the entities.

In an embodiment of the present invention, to customize presentation at the client side, the presentation customization service at the client side gets connected to the context creation service and the profile details service at the service side. The presentation customization service facilitates the tenant administrator to customize and personalize the rendering of at least one of: customized entities, resources, themes, web parts, and personalization data, wherein the customized entities, resources, themes, web parts, and personalization data are associated with plurality of tenants for branding. The support for tenant aware rendering is facilitated by the framework 400A and a templating syntax is provided which makes it compatible with any appropriate view engine. In an embodiment of the present invention, placeholders for the resources may be added and the tenant administrators may upload the predefined resources. The tenant administrator may further map the resources with the placeholders using the administration module 412A. Further, a client side component may generate a resource URL from the web application and a web component, associated with the administration module 412A, may provide the configured resources for the placeholder for the given tenant. Further, in an embodiment of the present invention, the product administrator, the tenant administrator, and a tenant specific user participate in the resource customization. The product administrator may create the metadata for web application specific placeholders. The tenant administrator may create tenant specific resources and may map them with the placeholders with predefined metadata. Finally, the tenant specific users in the subscription specific business roles may consume the customized resources through the web application. Further in an embodiment of the present invention, the framework further comprises plurality of tenant aware components for implementing a plurality of customized SaaS based multi-tenant web applications. In other words, the framework 400A provides support for tenant personalization using tenant profile, resources and end to end support for type extensibility including different presentations for different business features without any additional code.

In an embodiment of the present invention, for monitoring, error handling and notifications at the client side, the monitoring service, the error handling service and the notifications service get connected to the notification services on the service side. The error handling service is further connected to logging services on the service side. In an embodiment of the present invention, the error handling service provides support for custom error handling. The error handling service further provides components that are provided with context information associated with nature of error associated with the framework 400A. In an embodiment of the present invention, the monitoring service may facilitate various monitoring activities based on metering data including the data associated with quota management.

Further, the service error handling facilitates customization of exception handling. In an embodiment of the present invention, to facilitate the customization of the exception handling, the exceptions occurring within the execution environment are handled by the configured components.

In an embodiment of the present invention, tenant administrators may customize workflow using an activity injection service. The activity injection service facilitates changes to the workflow by modifying sequence of execution of activities. The modification in the sequence is performed by adding metadata driven customization. The activity is injected according to the predefined configuration. The activity injection service injects a preprocessor and a post processor activity to the configured activities that are marked as features. The preprocessor activity and post processor activity are sequence activities and the activities configured in the metadata may be injected into them in sequence. Further, a workflow tracking service may be used for tracking the execution of a workflow and the external components may be invoked during various events related to the execution of each activity. To track the workflow on the client side, the tracking service on the client side gets connected to logging service on the service side. The events 'before execution', 'during the execution', and 'after the execution' of each activity and the workflow are observed by the tracking service and the runtime services like metering, authorization, and rule evaluation, are associated to the feature mapped to the executing activities. In an embodiment of the present invention, the workflow tracking service is a workflow runtime extension that receives the events from the workflow runtime using a tracking profile. The tracking runtime may run in the same workflow host instance where the workflow is running and serves the tracking events to the tracking service in the same thread of execution thereby, adding slight delay in the overall execution. Further, the events such as workflow events, activity events and the user events that the tracking service may receive are defined in the tracking profile. A set of framework services are loosely associated with the tracking services based on the events that the tracking profile receives. In other words, workflow customization is not only limited to empowering the tenants to customize the workflow and their activities, but the framework 400A further extends the workflow runtime by adding a native support to tenant awareness, workflow interception, controlling the execution of the workflow externally, and the choice of automatic or manual integration of framework services. The framework services include, without any limitation, metering, logging, authorization, and rule evaluation. The framework 400A also provides choice of configuring the consumption of each of the framework services either as locally available or as a hosted service.

In an embodiment of the present invention, for evaluating rules at the client side, the rule evaluation service on the client side gets connected to the rule evaluation services on the service side. Further, the rule evaluation service facilitates the tenant administrator to define rules using the administration module 412A using either a manual approach or an automatic approach. In an embodiment of the present invention, the runtime module 502 facilitates metadata driven rule evaluation. In embodiments of the present invention, a rules domain may comprise, without any limitation, an injection point, an object alias, a rule set, a data type of the object, features associated with the web application, an activity and the web application. An injection point is a logical grouping of features during the execution of which a set of rules are to be evaluated. The injection point is configured during the deployment time in the application configuration. Object alias is a unique identifier annotated on the definition of the objects upon which one or more rule set needs to be evaluated. Object alias helps to identify multiple objects of same data type at a given injection point uniquely. When the metadata is exported, the object alias will have a unique identifier along with the data type. A rule set is a set of rules to be evaluated upon an object of a specific data type. In an embodiment of the present invention, in the framework 400A, a rule set is associated to an object alias at an injection point and not to a data type.

In an embodiment of the present invention, the tenant administrator defines the rules by selecting each object aliases at each injection points and the rule will be stored in the canonical structure specific to the framework 400A. All the rules for an object alias at an injection point are considered as a rule set when the rule engine adapter performs the transformation. The runtime module 502 evaluates the rules on objects of different object aliases at a given injection point connecting to the rule evaluation service. The rule evaluation service abstracts the rule engine using a rule engine adapter, enabling the choice of rule engine integration a deployment decision than a development decision. In an embodiment of the present invention, the framework 102 supports integrating with any rule engine known in the art or that may evolve. Further, the choice of a using a rule evaluation engine can be decided as late as possible, even during the deployment time. The rule engine adapter loads the canonical rules from the metadata storage, converts them to the underlying rule format and evaluates them using the underlying rule engine. The rule evaluation service takes the results, merges them using Rete algorithm and sends the merged results back to the runtime module 502. In an embodiment of the present invention, the rule evaluation service is implemented using the framework service component specification 524 so as to connect as a local service or a hosted service. Further, the runtime module updates the values from the rule evaluation result back to the state of actual object after comparison of the state.

In an embodiment of the present invention, the authorization service at the client side gets connected to the context creation service at the service side to facilitate authorization on the client side. The authorization service facilitated by the runtime module 502 is metadata driven and flexible based on the dynamic nature of the roles and the resources available according to the subscription package details. The authorization service considers any atomic element of the SaaS based web application as a business feature (or feature) and determines whether a particular user of a tenant can access the feature or not by considering the corresponding tenant's subscription plan and the tenant defined role. As described earlier, a subscription plan contains a predefined number of features that are subscribed and grouped logically according to the business requirements of the SaaS provider. Further, the tenant administrator creates different roles and associates a set of features out of the subscription plan to the created roles. The role based feature authorization allows the tenant administrator to authorize the roles at a granular level. Further, this association or mapping is known as feature privileges. In an embodiment of the present invention, the feature privileges are taken into consideration to identify whether a user of a particular role can access a particular business feature or not. In other words, the role based feature authorization enables the tenant administrator to authorize the roles at a very minute level of its implementation. Further, every single method or a user control or a particular resource subscribed can be entitled to participate in authorization without any additional development of a software code. Further, the authorization mechanism is wide and deep so as to cover the authorization of components of different dimensions under a similar approach but at a very minute level of implementation. In an exemplary embodiment of the present invention, the minute levels may reach to the levels of property level, method level or at the level of a field of a table. Multiple levels of authorization ensure that the access right to any of the resources extends to the entitlement of the subscription plans. Further, the authorization is associated with the underlying runtime so as to ensure it is not compromised and automatically allowing the codeless integration of the authorization mechanism.

Further, in an embodiment of the present invention, a Globally Unique Identifier (GUID) is associated with each feature to uniquely identify it from the rest of the features. The details of the feature including the GUID and the default name are annotated on each resource and exported to XML using the framework metadata exporter tool. The details are further imported to the metadata definition when creating a SaaS based web application. The authorization service at the runtime module 502 reads the annotation on each resource and matches it with the authorization details provided in the metadata to grant or deny the access rights to different users of different tenants accordingly. Further as discussed above, the different roles may be categorized as roles associated with the administration module 412A, roles associated with framework components, and roles associated with the SaaS based web application. The roles associated with the administration module 412A comprise web user or unregistered user or anonymous role, tenant administrator, and product administrator. The unregistered role is one which has the access rights to browse through the SaaS based multi-tenant web application and act as a tenant administrator using the administration module 412A. The tenant administrator is one who can create tenant specific tasks including, without any limitation, users management, entitlement management, tenant customizations, viewing, and paying bill. The product administrator role is a super role that can manage complete metadata, including the application management and subscription management. The roles associated with framework components comprise developers and business roles. The developers are the direct users of the framework 400A to develop or enable a SaaS based multi-tenant web application. The business roles are specific to the subscription associated with the business users and the business users (or users) are specific to the tenants. To facilitate authorization to the features, the authorization service accesses rights of features for each business user based on all the roles associated with the business user. Further, the roles associated with the web application are defined by the tenant administrator and are broken down in to the feature access rights. The feature access rights correspond to business roles.

In an embodiment of the present invention, to facilitate authentication of tenants and/or users associated with the tenants, the authentication service at the client side gets connected to the context creation service and membership services on the service side. The authentication service facilitates authentication of users and/or tenants through forms. In an embodiment of the present invention, after the authentication process is complete different contexts are created by consuming context creation services. In an embodiment of the present invention, the authentication process may comprise checking of the claims or the credentials of the users and/or the tenants by the membership service at the service side. The membership service may authenticate credentials or claim at the client side. In an embodiment of the present invention, the credentials or claim are validated under the scope of the current tenant. In an embodiment of the present invention, if the authentication fails a predetermined number of times the status of the account is converted to 'Lockout'. Once the validation status is achieved after the authentication, the membership service checks for the 'Lockout' status. Upon successful authentication, the subscription context and the subscription based access rights are created. This further result in creation of the user context and access rights of the user.

Further in an embodiment of the present invention, the framework services module 504 facilitates identification of tenant or users who can access the web application. The user-to-tenant relationship is key information that is used to restrict the data that can be accessed by the user of a particular tenant. Thus, multi-tenancy requires that all the users that sign-on to access the web application be identified to determine which tenant they belong to. In embodiments of the present invention, the framework services module 504 may facilitate tenant identification using, without any limitation, Uniform Resource Locator (URL) and User login. In an embodiment of the present invention, the framework services module 504 facilities identification of users using a unique URL assigned to the user of a particular tenant for accessing the web application. The URL based tenant identification facilitates identifying the tenant before a user is identified and thus, enabling the framework 400A to serve the tenant customized contents before the user logs on to access the entitled features of the web application. In other words, the URL tenant identification mode enables identifying the tenant even before the user is identified, and thus enabling the web application to serve the tenant customized contents even before a user logs into the system. In another embodiment of the present invention, the framework services module 504 facilities tenant identification during the user login. In other words, the choice of the tenant identification mode i.e. either the URL mode or the user login mode can be made by configuring the framework 400A. Further, the framework 400A allows architects to build solutions targeting any of the tenant identification modes of their choice and as late as i.e., post deployment. Also, the framework 400A supports switching the tenant identification modes on the hosted web application by changing the configurations without any downtime.

Returning back to FIG. 4A, using the front end 402A, business users associated with a tenant may access the features 414A of a business application based on their roles. The roles for the business users are specific to the subscription package subscribed by the tenant and may be defined by the tenant administrator. The runtime module 416A using the runtime services provided by the runtime services module 428A facilitates access of the features 414A to the business users. In an embodiment of the present invention, the runtime module 416A facilitates access of the features 414A by checking the access rights corresponding to the features 414A for the business user based on the roles assigned to the business user.

The web application services module 404A comprises the features 418A associated with the web application. The runtime module 420A is communicatively coupled to the runtime services module 428A to facilitate SaaS and crosscutting services for the features 418A. The business data store 406A comprises the business data associated with the features 418A. In embodiments of the present invention, the business data store 406A may support, without any limitation, NoSQL, Relational Database Management Systems (RDBMS), and Extensible Markup Language (XML).

The report services module 422A facilitates reporting services including usage information and pricing. Further, the report services provide on demand and scheduled statistical data in numerous dimensions. In an embodiment of the present invention, the framework services APIs helps the runtime module 426A's components to connect to the metadata in the metadata store 410A and the report APIs provides statistical data to the code block.

The metadata services module 424A provides metadata services that facilitate abstraction of the storage structure of metadata and act as APIs for managing the metadata programmatically. The different metadata services supported by the framework 400A include, without any limitation, application management service, subscription management service, package management service, type customization service, privilege management service, user management service, rule management service, resource management service, and profile management service. Further, the metadata services are implemented according to the framework service component specification, ensuring they can be either consumed as a local service or a hosted service or a configuration.

The runtime services module 428A provide runtime services including, but not limited to, a metering service, a quota management service, a context awareness service, a type customization service, a presentation customization service, an asynchronized context service, a monitoring service, an error handling service, a tracking service, a notification service, a rule evaluation service, an authorization service, and an authentication service. The runtime module consumes the runtime services for different components of the framework 400A to facilitate implementation of multi-tenant architecture.

The metadata store 410A is communicatively coupled to the framework services module 408A and comprises framework metadata that is required by the different components of the framework 400A to implement the multi-tenant architecture. The framework metadata comprises configuration metadata, customization metadata and statistics metadata. The details of the configuration metadata, customization metadata and statistics metadata have been described in conjunction with FIG. 1. In an embodiment of the present invention, the framework 400A facilitates an isolated data model for the framework metadata and the business application data. In another embodiment of the present invention, the framework 400B facilitates a shared data model for the framework metadata and the business application data. In an embodiment of the present invention, a single metadata storage and metadata administration module can cater to multiple SaaS applications and thus, reduces the cost and improves the standards. In embodiments of the present invention, the metadata store 410A may support, without any limitation, NoSQL, RDBMS, and XML. Further in an embodiment of the present invention, the framework may support horizontal partitioning of the metadata in accordance with multiple instances of the schema associated with the metadata.

The administration module 412A acts as the front end for managing the framework metadata. The metadata management module 430A is communicatively coupled to the metadata data services module 424A to facilitate the management of the framework metadata. The metadata management module 430A facilitates consumption of the metadata services from the metadata data services module 424A to manage the framework metadata. The runtime module 432A is further communicatively coupled to the runtime services module 428A to consume runtime services required for the management of the framework metadata. Further in an embodiment of the present invention, the administration module 412A provides a tool rule designer for enabling the tenant administrator to define the custom rules for the business applications, the tenant is subscribed for. Further, a tool for framework metadata import in the administration module 412A enables the product or SaaS administrator to upload the framework metadata as an XML file generated by the metadata exporter tool. The metadata exporter is a tool enabling the developers and product administrators to import the framework metadata from the application including the feature details, extensible types, injection points, object alias and their feature mapping for automatic rule evaluation. In other words, the administration module 412A provides an end to end solution for all the SaaS functionalities including, without any limitation, application management, tenant management, tenant on-boarding, tenant provisioning, subscription management, user and role management, and reports. A single administration module can manage the metadata of multiple SaaS based multi-tenant web applications. Further, the administration module 412A acts as a sales system displaying all the web applications and the plans under each application. The administration module 412A further enables an anonymous web user to subscribe for the required web application and onboard as a tenant administrator.

Figure 8:
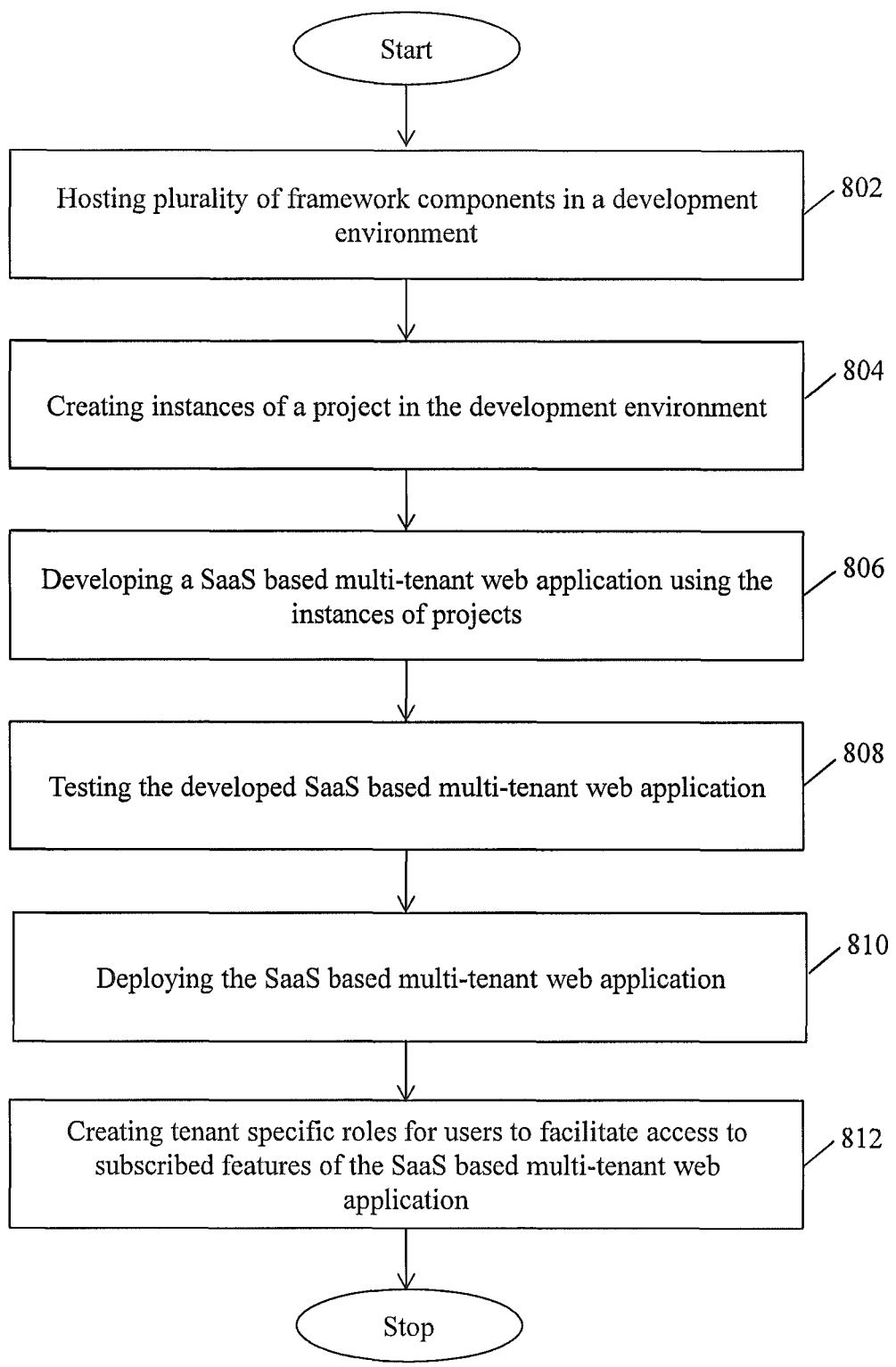
FIG. 8 is a flowchart depicting a method to implement multi-tenant architecture in accordance with an embodiment of the present invention.

FIG. 8 is a flowchart depicting a method to implement multi-tenant architecture in accordance with an embodiment of the present invention. The method initiates at step 802 with hosting of framework components in a development environment. In an embodiment of the present invention, hosting the framework components comprises creating a framework metadata store, hosting metadata services, hosting administration module, and running a setup to copy project assemblies, templates, XSD files, snippets, and other IDE integration and extensibility components. In an exemplary embodiment of the present invention, the development environment may have an Interactive Development Environment tool such as, but not limited to, Microsoft® Visual Studio®. The framework metadata store may be created using tools, scripts, and guidelines, and stores metadata that is used by the framework to implement multi-tenant architecture. In an embodiment of the present invention, the framework metadata store may be an isolated data store. In another embodiment of the present invention, the framework metadata store may be a co-existing data store that co-exists with a data store comprising data associated with the web application.

Upon creation of the framework metadata store, the metadata services are hosted to manipulate the framework metadata. The metadata services facilitate abstraction of the storage structure of metadata and act as APIs for managing the metadata programmatically. The different metadata services may include, without any limitation, application management, subscription management, package management, type customization, privilege management, user management, rule management, resource management, and profile management. Further, the metadata services are implemented according to the framework service component specification, ensuring they can be either consumed as a local service or a hosted service or a configuration.

After the hosting of the metadata services, the administration module is hosted in the development environment. The administration module is a role based self service portal that acts as a tool or frontend for end to end manipulation of the framework metadata. The details of the administration module have been described in conjunction with FIGS. 1 and 4A. Upon hosting of the metadata services, setting up of the developer environment with the project assemblies, templates, XSD files, snippets, and other IDE integration and extensibility components is achieved for implementation of the multi-tenant architecture.

At step 804, instances of projects are created in the development environment. The instances of projects are the basic building blocks of the SaaS based multi-tenant web application or the web application in the IDE. In an embodiment of the present invention, for developing a green field application with multi-tenant architecture, a new project instance is created using the templates and a starter kit. In another embodiment of the present invention, for developing a green field application with multi-tenant architecture for custom requirements, a new project instance is created by referring to predefined assemblies. In yet another embodiment of the present invention, for implementing multi-tenant architecture for a non-SaaS based web application existing project assemblies in the non-SaaS based web application are referred.

At step 806, the web application is developed using the instances of projects. The development of the web application starts with incorporating required business functionalities or features within the project instance. Upon implementing the features, required configurations are added and a name and title for the web application is set. Further, hosted metadata services are pointed to the instances of project from hosted URL and features of the web application are annotated as framework features. The metadata is then exported using a tool metadata exporter and the metadata associated with the web application is imported to the administration module for the development environment.

At step 808, testing of the web application is performed. The testing of the web application is performed by debugging and testing the functionalities of the features associated with the web application. After the testing is performed, deployables associated with the web application are prepared and the metadata associated with the web application is exported using the tool metadata exporter.

At step 810, the web application is deployed. The deployment process of the web application comprises creating a database for production, hosting metadata services for production, hosting administration module for production, running initial data load and creating a product administrator role, hosting the distributed web application and modifying the associated configurations, and importing the metadata to the administration module. After the web application is deployed, the web application is ready to be used by tenant administrators after they subscribe to the web application. The tenant administrator perform activities like subscribing to the web application, changing the subscription package, creating custom resources and localization, defining presentation, customizations and branding, and defining type customizations and validations.

At step 812, tenant specific roles are created for the users associated with the tenant for facilitating access to the subscribed features of the web application. The roles are specific to the subscription packages and are created by the tenant administrator. Upon creating the roles for the users, the tenant administrator manages the users and the corresponding rules. The tenant administrator further schedules tasks and services associated with the web application, defines alerts and notifications, creates and view custom reports, and views and pays bill based on the usage of the features of the web application. The deployed web application is also accessed by the product administrator who can create and modify pricing models, web application and associated metadata, and subscription plans or packages. The product administrator can further manage tenants and subscriptions, view metering and monitoring data, generate feature usage reports, create and view custom reports, and manage user roles and privilege management. In an embodiment of the present invention, the tenant administrator and the product administrator access the administration module to perform their respective functions.

Further in an embodiment of the present invention, a computer program product is provided that comprises a non-transitory computer-readable medium having computer-readable program code stored thereon. The computer-readable program code comprises instructions that when executed by a processor cause the processor to host a plurality of framework components in a development environment. In an embodiment of the present invention, the framework components comprise framework metadata store, metadata services, and an administration module. The processor further creates instances of projects in the development environment. In an embodiment of the present invention, the instances of projects are created using templates, and predefined existing projects for at least one of a green field application and a non Software-as-a-Service (SaaS) based application. The processor furthermore develops a SaaS based multi-tenant web application using the instances of projects. In an embodiment of the present invention, the SaaS based multi-tenant web application is developed by incorporating features for at least one of a green field application and a non SaaS based web application. The processor furthermore tests the developed SaaS based multitenant web application for checking functionalities of the features associated with the SaaS based multitenant web application. The processor furthermore deploys the SaaS based multitenant web application. The processor furthermore creates tenant specific roles for users associated with a tenant for facilitating access to subscribed features of the SaaS based multitenant web application.

Figure 9:
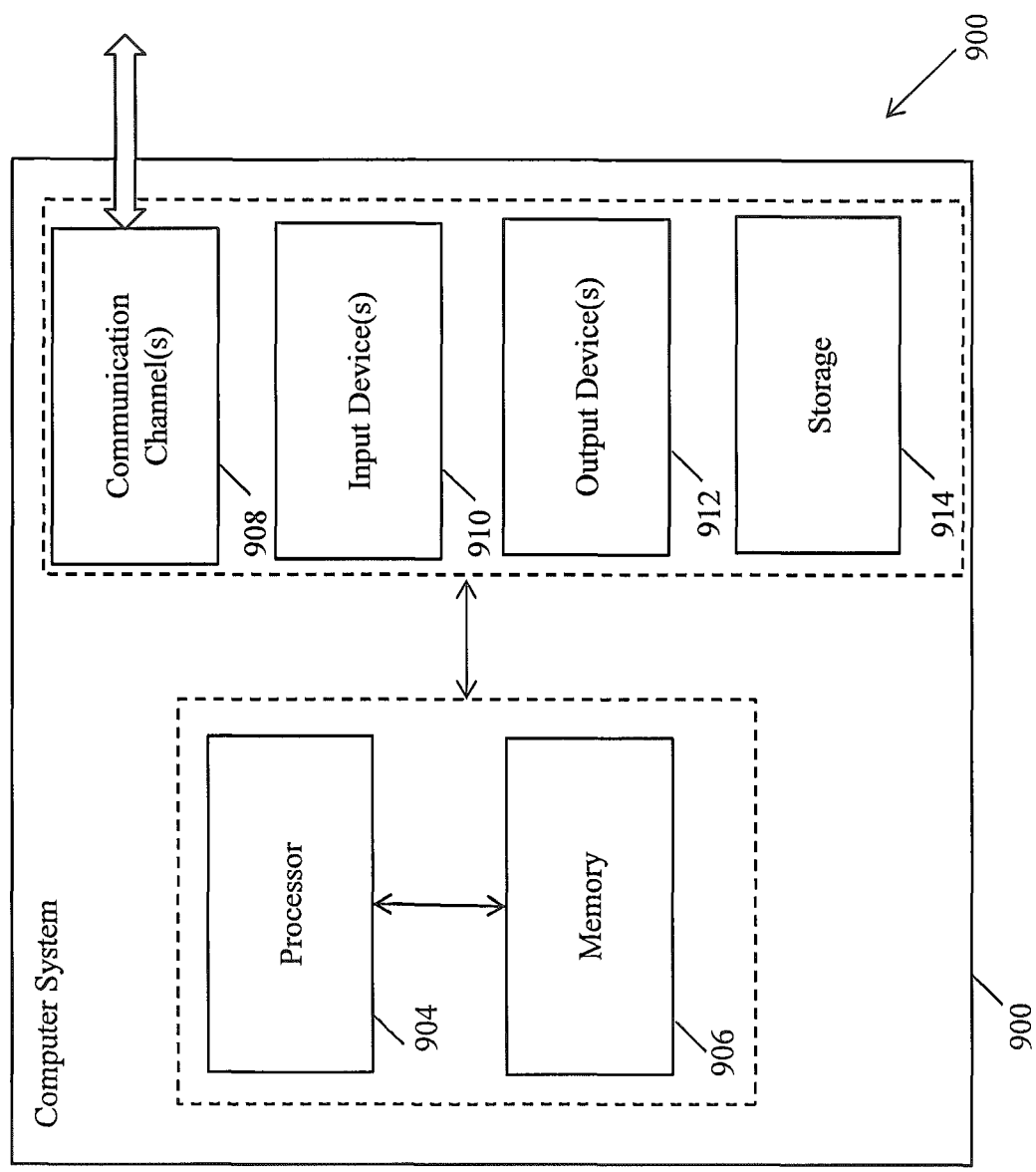
FIG. 9 illustrates an exemplary computer system in which various embodiments of the present invention may be implemented.

FIG. 9 illustrates an exemplary computer system in which various embodiments of the present invention may be implemented.

The computer system 902 comprises a processor 904 and a memory 906. The processor 904 executes program instructions and may be a physical processor. The processor 904 may also be a virtual processor. The computer system 902 is not intended to suggest any limitation as to scope of use or functionality of described embodiments. For example, the computer system 902 may include, but not limited to, a general-purpose computer, a programmed microprocessor, a microcontroller, a peripheral integrated circuit element, and other devices or arrangements of devices that are capable of implementing the steps that constitute the method of the present invention. In an embodiment of the present invention, the memory 906 may store software for implementing various embodiments of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various software executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 910 may include, but not limited to, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 902.

The storage 914 may include, but not limited to, magnetic disks, magnetic tapes, CD-ROMs, CD-RWs, DVDs, flash drives or any other medium which can be used to store information and can be accessed by the computer system 902. In various embodiments of the present invention, the storage 914 contains program instructions for implementing the described embodiments.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A framework for implementing multitenant architecture, the framework comprising:
   a memory containing a framework services module, a run time module, a meta data services module, and a role based administration module, wherein the administration module is a user interface that facilitates management of the metadata through roles comprising at least one of: a Tenant Administrator and a Product Administrator;
   a processor coupled to the memory and programmed to:
   provide a plurality of framework services using the framework services module, wherein the plurality of framework services facilitate abstraction of Software-as-a-Service (SaaS) services and crosscutting services for at least one of: a green field application and a non SaaS based web application;
   automatically integrate and consume the framework services and a plurality of Application Programming Interfaces (APIs) in a predefined manner, using the run time module, to facilitate monitoring and controlling of features associated with the SaaS based multitenant web application, further wherein the metadata is stored in a metadata store; and
   provide a plurality of metadata services using the metadata service module, wherein the metadata services facilitate abstraction of storage structure of metadata associated with the framework, and act as APIs for managing the metadata.

2. The framework of claim 1, wherein the plurality of framework services comprise at least one of: a context creation service, a metering service, a profile details service, a logging service, a notification service, a membership service, and a rule evaluation service.

3. The framework of claim 1, wherein the SaaS based multitenant web application is at least one of: a user interface enabled web application, a web application that incorporates plurality web services distributed over web, and a rich internet application.

4. The framework of claim 1, wherein the SaaS based multitenant web application is hosted in at least one of: a Virtual Private Data Center (VPDC), a Virtual Private Cloud (VPC), and a public cloud.

5. The framework of claim 1, wherein the APIs comprise service side APIs and client side APIs and are provided by an API module, further wherein the service side APIs are associated with the framework services module and allow the runtime module to connect to the metadata, the client side APIs are associated with the runtime module and allow access to client side services to a calling code.

6. The framework of claim 1, wherein the runtime module facilitates monitoring and controlling of features by providing a plurality of runtime services, the plurality of runtime services comprising a metering service, a quota management service, a context awareness service, a type customization service, a presentation customization service, an asynchronized context service, a monitoring service, an error handling service, a tracking service, a notification service, a rule evaluation service, an authorization service, and an authentication service.

7. The framework of claim 6, wherein the metering service facilitates metering of usage of each of the features associated with the SaaS based multitenant web application, transfer of data corresponding to the features, and usage time of the features at a granular level by facilitating recording and monitoring of every single use of designated feature, further wherein the metering service facilitates metering a request and a corresponding response of a request-response cycle and records each feature usage within the request-response cycle using predefined co-relations between the requests and responses.

8. The framework of claim 6, wherein the monitoring service facilitates triggering actions when access to the features reaches to a predefined limit for at least one of: a tenant and a user associated with the tenant.

9. The framework of claim 6, wherein the context awareness service facilitates loading of context data on client side, the context data comprising user context data, tenant context data, resource context data, subscription context data, and custom type context data.

10. The framework of claim 9, wherein a context exchange module establishes a bidirectional virtual channel to pass the context data between a service client on the client side and a framework service on the service side, further wherein the passing of the context data is in at least one: half duplex mode and full duplex mode.

11. The framework of claim 6, wherein the entity customization service allows tenants of the SaaS based multi-tenant web application to customize entities by adding additional fields comprising predefined business requirements, governance, and reporting, further wherein the customization of entities is facilitated by a type extensibility component.

12. The framework of claim 11, wherein the type extensibility component facilitates customization of entities by providing a support for its consumption using a template that is independent of underlying technology of the framework.

13. The framework of claim 6, wherein the presentation customization service facilitates the tenant administrator to customize and personalize rendering of at least one of: customized entities, resources, themes, web parts, and personalization data, wherein the customized entities, resources, themes, web parts, and personalization data are associated with plurality of tenants.

14. The framework of claim 6, wherein the asynchronized context service provides an update on the state of the asynchronous operations that take place on web.

15. The framework of claim 6, wherein the rule evaluation service facilitates the tenant administrator to define rules using the administration module, further wherein the defined rules are mapped with objects in injection points defined in the SaaS based multi-tenant web application, further wherein the rules are evaluated using at least one of: a manual approach and an automatic approach.

16. The framework of claim 6, wherein the authorization service facilitates role based feature authorization by allowing the tenant administrator to create roles and map the created roles with the features associated with the SaaS based multitenant web application.

17. The framework of claim 1, wherein the runtime module further comprises a framework service component specification, the framework service component specification is configured to allow a service client to connect to the plurality of framework services being hosted at least one of: remotely and locally.

18. The framework of claim 1, wherein the runtime module further provides a native object lifetime management service for controlling lifetime of objects, further wherein the native object lifetime management service provides an appropriate lifetime management extension that connects life span of an object with underlying technology of the framework to control the lifetime of the object.

19. The framework of claim 1, wherein the runtime module further abstracts a dependency injection container for resolving the abstracted framework service, further wherein design of the abstraction of the dependency injection container facilitates integration of a plurality of dependency injection mechanism within the framework without recompiling the SaaS based multi-tenant web application.

20. The framework of claim 1, wherein the runtime module further abstracts an interception runtime for enabling Inversion of Control (IoC) and allowing interception layer to connect to a plurality of interception providers.

21. The framework of claim 1, wherein the runtime module further facilitates tenant awareness and isolation of data associated with a plurality of tenants by extending state management in an underlying tier using a native object lifetime management service and isolating data associated with the plurality of tenants within the runtime module.

22. The framework of claim 1, wherein the plurality of metadata services comprise at least one of an application management service, a subscription management service, a package management service, a type customization service, a privilege management service, a user management service, a rule management service, a resource management service, and a profile management service.

23. The framework of claim 1, wherein the administration module further facilitates an unregistered user to browse through the SaaS based multitenant web application and associated usage plans, subscribe to associated usage plans and act as a tenant administrator.

24. The framework of claim 1, wherein the administration module further facilitates the tenant administrator to customize workflow associated with the features of the SaaS based multitenant web application.

25. The framework of claim 1, wherein the administration module further facilitates the tenant administrator to perform at least one of: management of users associated with the tenant, entitlement management, privilege management, tenant customization, view bills based on usage of the features associated with the SaaS based multitenant web application, bill payments, and define custom rules for the SaaS based multitenant web application.

26. The framework of claim 1, wherein the administration module further facilitates the product administrator to manage at least one of: subscription plans, pricing of the features, usage of the features, billing tenants based on usage of the features.

27. The framework of claim 1, wherein the metadata store resides in a shared data model with data associated with the SaaS based multitenant web application, further wherein the shared data model facilitates sharing of metadata among a plurality of SaaS based multitenant web applications.

28. The framework of claim 1, wherein the metadata store is isolated data storage.

29. The framework of claim 1 further comprising support for synchronization of metadata and data associated with the SaaS based multitenant web application, between two or more Relational Database Management Systems (RDBMS), and between RDBMS and Not Only Structured Query Language (NoSQL).

30. The framework of claim 1 further comprising support for horizontal partitioning of the metadata corresponding to multiple instances of the schema associated with the metadata.

31. The framework of claim 1, wherein the framework further facilitates identification of tenants using at least one of: a Uniform Resource Locater (URL) mode and a user login mode.

32. The framework of claim 1 further comprising support for enablement of the framework through at least one of: a runtime mode and consumption using an API.

33. The framework of claim 1 further comprising support for integration of the framework with at least one of: a private data center, Platform-as-a-Service (PaaS), and Infrastructure-as-a-Service (IaaS).

34. The framework of claim 1 further comprising support for plurality of extensible data contracts.

35. The framework of claim 1 further comprising plurality of tenant aware components for implementing development of a plurality of customized SaaS based multi-tenant web applications.

36. The framework of claim 1 further comprising support for decoupled and extensible architecture facilitating replacement of a component associated with the framework with a plurality of customized components.

37. The framework of claim 1 further comprising support for at least one of: per-request initialization and per-application initialization of the framework, wherein the per-request initialization facilitates stateless initialization of the framework and per-application initialization facilitates stateful initialization of the framework.

38. The framework of claim 1 further comprising components for custom error handling, wherein the components are provided with context information associated with type of error associated with the framework.

39. The framework of claim 1 further comprising a templates module, wherein the templates module is configured to provide a plurality of templates to facilitate implementation of multi-tenant architecture.

40. The framework of claim 1 further comprising a guidelines module, wherein the guidelines module is configured to provide a set of patterns, practices and samples for solving a set of standard and common problems associated with the SaaS based multitenant web application.

41. The framework of claim 1 further comprising support for integration with an Interactive Development Environment (IDE) by providing at least one of: project templates, item templates, code snippets, Extensible Markup Language (XML) schema validation, and configuration data.

42. A method for implementing multitenant architecture, the method comprising:
   hosting a plurality of framework components in a development environment that facilitate abstraction of Software-as-a-Service (SaaS) services and crosscutting services, wherein the framework components comprise framework metadata store, metadata services, and an administration module;
   creating instances of projects in the development environment, wherein the instances of projects are created using templates, and predefined existing projects for at least one of a green field application and a non Software-as-a-Service (SaaS) based web application;
   developing a SaaS based multi-tenant web application, based on the abstraction of the SaaS services and crosscutting services, using the instances of projects, wherein the SaaS based multi-tenant web application is developed by incorporating features for at least one of: the green field application and the non SaaS based web application;

testing the developed SaaS based multitenant web application for checking functionalities of the features associated with the SaaS based multitenant web application;

deploying the SaaS based multitenant web application; and creating tenant specific roles for users associated with a tenant for facilitating access to subscribed features of the SaaS based multitenant web application.

43. A computer program product comprising:

a non-transitory computer-readable medium having computer-readable program code stored thereon, the computer-readable program code comprising instructions that when executed by a processor, cause the processor to:

host a plurality of framework components in a development environment that facilitate abstraction of Software-as-a-Service (SaaS) services and crosscutting services, wherein the framework components comprise framework metadata store, metadata services, and an administration module;

create instances of projects in the development environment, wherein the instances of projects are created using templates, and predefined existing projects for at least one of: a green field application and a non Software-as-a-Service (SaaS) based web application;

develop a SaaS based multi-tenant web application, based on the abstraction of the SaaS services and crosscutting services, using the instances of projects, wherein the web application is developed by incorporating features for at least one of: the green field application and the non SaaS based web application;

test the developed SaaS based multitenant web application for checking functionalities of the features associated with the SaaS based multitenant web application;

deploy the SaaS based multitenant web application; and create tenant specific roles for users associated with a tenant for facilitating access to subscribed features of the SaaS based multitenant web application.

\* \* \* \* \*